(12) United States Patent
Ono

(10) Patent No.: US 9,072,130 B2
(45) Date of Patent: Jun. 30, 2015

(54) ILLUMINATION SYSTEM WITH COMFORT AT LOW POWER CONSUMPTION

(71) Applicant: Panasonic Corporation, Osaka (JP)

(72) Inventor: Tamami Ono, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 205 days.

(21) Appl. No.: 13/920,170

(22) Filed: Jun. 18, 2013

(65) Prior Publication Data

US 2014/0001964 A1 Jan. 2, 2014

(30) Foreign Application Priority Data

Jun. 27, 2012 (JP) ................................. 2012-143898

(51) Int. Cl.
  *H05B 37/02* (2006.01)
(52) U.S. Cl.
  CPC ........... *H05B 37/0209* (2013.01); *Y02B 20/445* (2013.01); *H05B 37/0227* (2013.01); *Y02B 20/44* (2013.01)
(58) Field of Classification Search
  CPC ........... H05B 37/0209; H05B 37/0227; Y02B 20/44; Y02B 20/445
  See application file for complete search history.

(56) References Cited

U.S. PATENT DOCUMENTS

| 2010/0265100 | A1* | 10/2010 | Jalbout et al. ............ 340/932.2 |
| 2012/0019168 | A1 | 1/2012 | Noda et al. |
| 2014/0042911 | A1* | 2/2014 | Noguchi et al. ............ 315/152 |
| 2014/0265879 | A1* | 9/2014 | Dillen ............ 315/153 |
| 2014/0312779 | A1* | 10/2014 | Vissenberg et al. ........... 315/152 |

FOREIGN PATENT DOCUMENTS

| DE | 103 43 062 A1 | 5/2004 |
| JP | 2006-302517 A | 11/2006 |
| JP | 2007-171055 A | 7/2007 |
| JP | 2009-266502 A | 11/2009 |

(Continued)

OTHER PUBLICATIONS

Iwai et al., "New Lighting Evaluation Techniques for Comfortable Lighting Spaces Using Sensation-of-Room-Brightness Index "Feu"", Matsushita Technical Journal, vol. 53, No. 2, Jan. 2008 and partial English translation (cited in the specification).

(Continued)

*Primary Examiner* — Jung Kim
(74) *Attorney, Agent, or Firm* — Renner, Otto, Boisselle & Sklar, LLP

(57) ABSTRACT

An illumination system includes lighting apparatuses (20), a camera (11), an image processing unit (12) (person position detection unit), and a lighting control unit (14) and a storage unit (13) (control unit). The illumination apparatuses (20) are placed on a ceiling surface (C), and each include a first light source (24) and a second light source (25) that irradiate a floor surface (F) and the ceiling surface (C) with light, respectively. The control unit controls an illumination apparatus (20b2) corresponding to a person (P)'s position detected by the person position detection unit among the illumination apparatuses (20) so as to turn on the first light source (24). The control unit controls at least one of one or more illumination apparatuses (20) that are each adjacent to the illumination apparatus (20b2) so as not to turn on the first light source (24) and turn off the second light source (25).

6 Claims, 17 Drawing Sheets

(56) References Cited

FOREIGN PATENT DOCUMENTS

| | | |
|---|---|---|
| JP | 2011-171226 A | 9/2011 |
| WO | WO 2012/123352 A1 | 9/2012 |

OTHER PUBLICATIONS

Extended European Search Report for corresponding European Application No. 13003239.4 dated Nov. 4, 2013.

* cited by examiner

FIG. 4

| Identification information | Irradiation range | Adjacent relation |
|---|---|---|
| ... | ... | ... |
| 20a2 | 3a, 4a, 5a, 3b, 4b, 5b, 3c, 4c, 5c | 20f1, 20a1, 20b1, 20f2, 20b2, 20f3, 20a3, 20b3 |
| 20b2 | 3c, 4c, 5c, 3d, 4d, 5d, 3e, 4e, 5e | 20a1, 20b1, 20c1, 20a2, 20c2, 20a3, 20b3, 20c3 |
| 20c2 | 3e, 4e, 5e, 3f, 4f, 5f, 3g, 4g, 5g | 20b1, 20c1, 20d1, 20b2, 20d2, 20b3, 20c3, 20d3 |
| ... | ... | ... |

FIG. 5

| MSB | Identification information | Lighting instruction information | Error detection code | LSB |

FIG. 13

| Identification information | Irradiation range | Adjacent relation | | | |
|---|---|---|---|---|---|
| | | Right | Left | Up | Down |
| ... | ... | ... | ... | ... | ... |
| 20a2 | 3a, 4a, 5a, 3b, 4b, 5b, 3c, 4c, 5c | 20b2 | 20f2 | 20a1 | 20a3 |
| 20b2 | 3c, 4c, 5c, 3d, 4d, 5d, 3e, 4e, 5e | 20c2 | 20a2 | 20b1 | 20b3 |
| 20c2 | 3e, 4e, 5e, 3f, 4f, 5f, 3g, 4g, 5g | 20d2 | 20b2 | 20c1 | 20c3 |
| ... | ... | ... | ... | ... | ... |

FIG. 16
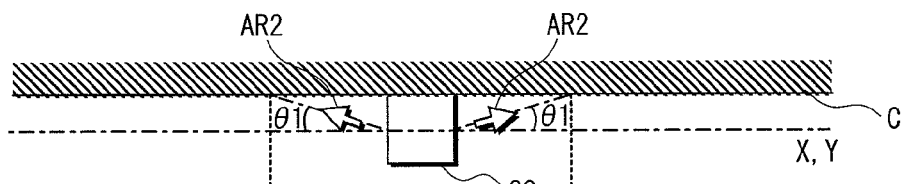
(a-1)
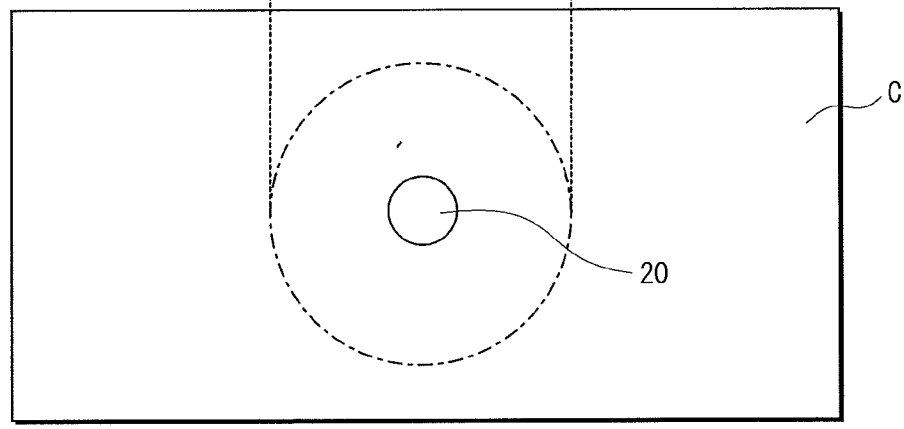
(a-2)
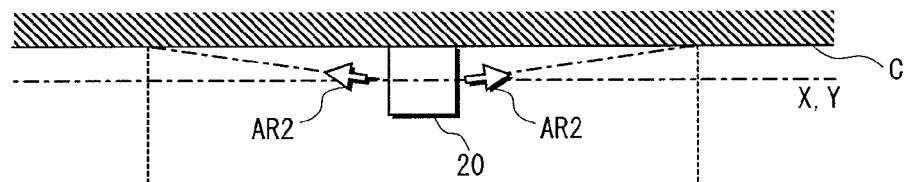
(b-1)
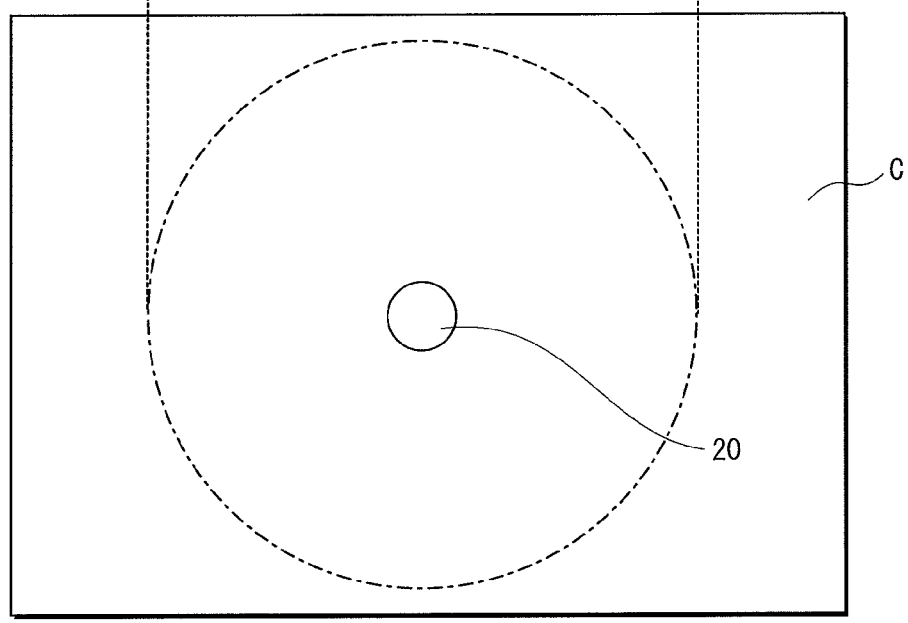
(b-2)

ILLUMINATION SYSTEM WITH COMFORT AT LOW POWER CONSUMPTION

TECHNICAL FIELD

The present invention relates to an illumination system that controls a lighting state of each of illumination apparatuses in accordance with a position of a person who is located in an illumination space.

BACKGROUND ART

Conventionally, there has been known an illumination system where a plurality of illumination apparatuses are placed on a ceiling surface and a floor surface that is opposed to the ceiling surface is irradiated with light. In this illumination system, a sensor detects presence of a person who is located in a space where illumination apparatuses are placed (hereinafter, illumination space), and only a necessary illumination apparatus is turned on, thereby reducing power consumption.

According to Patent Literature 1 for example, there has proposed an illumination system that includes a plurality of illumination apparatuses placed on a ceiling surface, a camera that captures the entire illumination space, a calculation unit that calculates a position of a person based on an image of the camera, and a control unit that controls the illumination apparatuses in accordance with the position of the person. According to this illumination system, the control unit stores beforehand therein irradiation range information indicating an irradiation range of each of the illumination apparatuses, specifies an illumination apparatus whose irradiation range includes the position of the person calculated by the calculation unit among the illumination apparatuses. Then, the control unit turns on the specified illumination apparatus while keeping the illumination apparatuses other than the specified illumination apparatus in OFF state. In such an illumination system, only a minimum necessary illumination apparatus is turned on, thereby reducing power consumption in the entire illumination system.

Compared with this, in an illumination system for use in an office and the like where a person stays for a long time, there is a demand for giving comfort to a person who is located in an illumination space, in addition to reduction in power consumption. Especially, there is a demand for realizing brightness of the illumination space such that the person who is located in the illumination space feels comfortable.

CITATION LIST

Patent Literature

[Patent Literature 1] Japanese Patent Application Publication No. 2009-266502

SUMMARY OF INVENTION

Technical Problem

By the way, a sense of brightness felt by a person who is located in an illumination space is greatly influenced by an area of a region where brightness is ensured which is included in a visual field of the person. Here, according to the illumination system disclosed in Patent Literature 1, although a desktop and a floor surface close to a person who is located in an illumination space are bright in a visual field of the person, a ceiling surface and a wall surface included in the visual field are not irradiated with light, and accordingly are dark. As a result, since the area of the bright region is small when viewed from the entire visual field, the person feels that the entire illumination space is dark. This might spoil the comfort, and therefore improvement is desired.

The present invention was made in view of the above matter problem, and aims to provide an illumination system that improves comfort of a person who is located in an illumination space while realizing energy saving.

Solution to Problem

In order to solve the above problem, an illumination system relating to one aspect of the present invention comprising: a plurality of illumination apparatuses that are placed on a first surface; a person position detection unit configured to detect a position of a person who is located in a space between the first surface and a second surface that is opposed to the first surface; and a control unit configured to control a lighting state of each of the plurality of illumination apparatuses in accordance with the position of the person detected by the person position detection unit, wherein each of the plurality of illumination apparatuses includes a first light source that irradiates the second surface with light and a second light source that irradiates the first surface with light, the control unit controls, among the plurality of illumination apparatuses, an illumination apparatus corresponding to the position of the person so as to turn on the first light source, and the control unit controls, among the plurality of illumination apparatuses, at least one of one or more illumination apparatuses that are each adjacent to the illumination apparatus that turns on the first light source, so as to turn on the second light source without turning on the first light source.

In the illumination system relating to the above aspect, the following structures may be included.

The control unit controls the illumination apparatus that turns on the first light source so as to turn on the second light source.

The person position detection unit is further configured to detect a direction in which the person faces, the control unit controls the at least one illumination apparatus that is adjacent, in the direction in which the person faces detected by the person position detection unit, to the illumination apparatus that turns on the first light source, so as to turn on the second light source without turning on the first light source.

The control unit controls all of the one or more illumination apparatuses that are each adjacent to the illumination apparatus that turns on the first light source, so as to turn on the respective second light sources.

The control unit controls all of the plurality of illumination apparatuses so as to turn on the respective second light sources.

The first light source has a higher color temperature than the second light source.

Advantageous Effects of Invention

According to the structure of the illumination system relating to the above aspect, the control unit controls at least one illumination apparatus, which is adjacent to an illumination apparatus that turns on the first light source, not to turn on the first light source. This reduces electric power consumed in the illumination system, thereby realizing energy saving.

Also, the control unit controls an illumination apparatus, which corresponds to the position of the person, to turn on the first light source, thereby ensuring brightness around the person on an irradiated surface in the illumination space. Furthermore, the control unit controls at least one illumination apparatus, which is adjacent to the illumination apparatus that turns on the first light source, to turn on the second light source, thereby also ensuring brightness of the first surface (ceiling surface). As a result, there are many bright regions viewed from the entire visual field of the person who is located in the illumination space, and accordingly the person who feels that the entire illumination space is bright. This improves the comfort in the illumination space.

BRIEF DESCRIPTION OF DRAWINGS

FIG. 4 is a conceptual diagram showing part of a management table relating to Embodiment 1.

FIG. 5 shows a format of an instruction signal used in the illumination system relating to Embodiment 1.

FIG. 13 is a conceptual diagram showing a management table relating to Embodiment 3.

FIG. 16 is a pattern diagram for explaining a relation between an angle formed by an X-Y plane and a main light emission direction of a second light source and an irradiation range of the second light source.

DESCRIPTION OF EMBODIMENTS

The following describes embodiments relating to the present invention with reference to the drawings.

Embodiment 1

<1> Structure of Illumination System

Figure 1A:
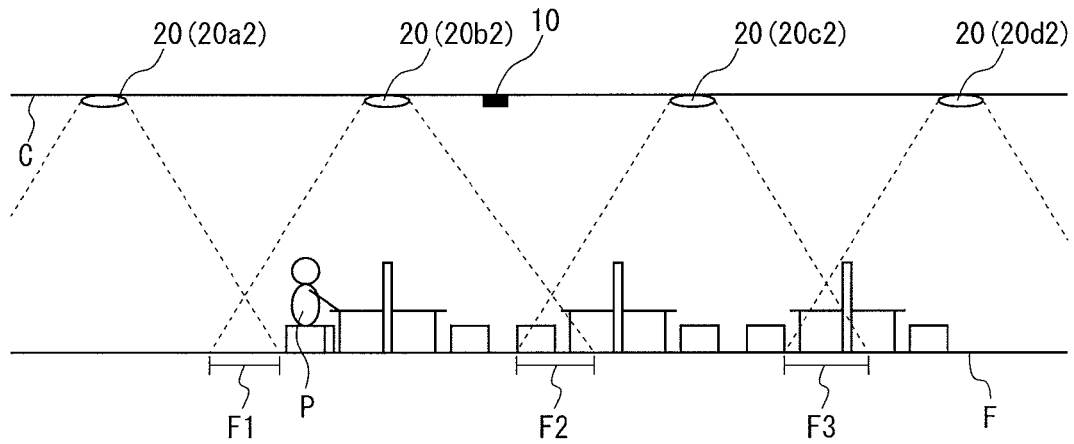
FIG. 1A is a pattern diagram showing a situation of an illumination space where a plurality of illumination apparatuses and a camera sensor module are placed that constitute an illumination system relating to Embodiment 1.
Figure 1B:
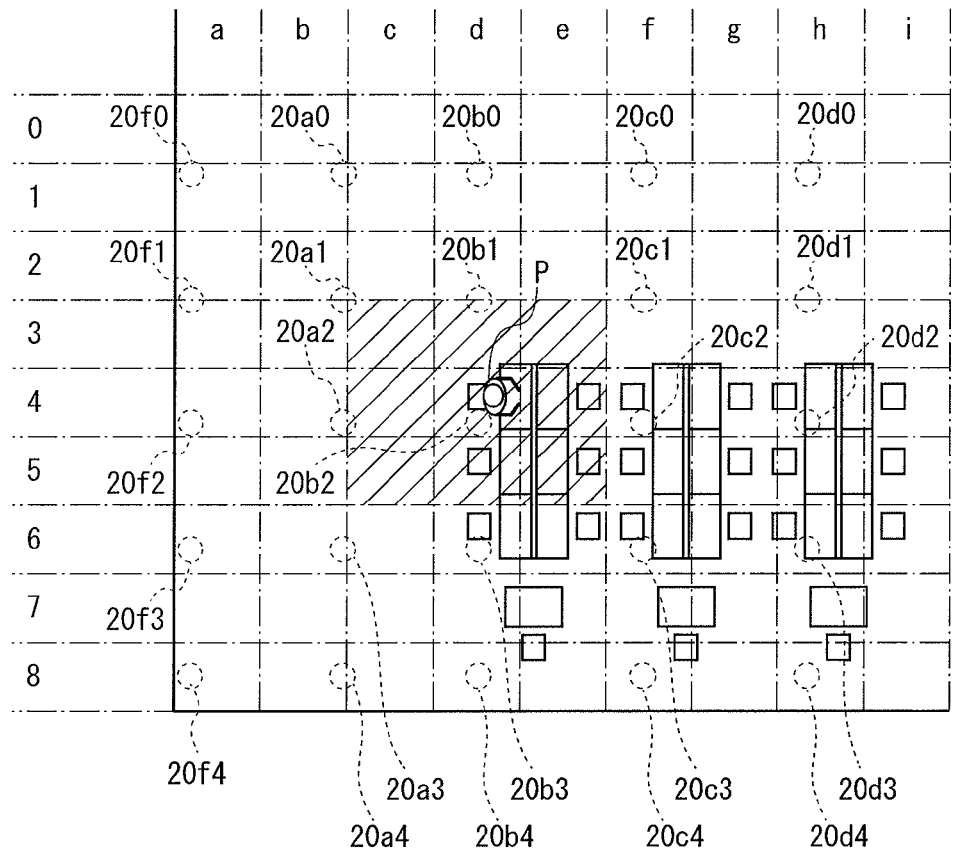
FIG. 1B is a planar layout diagram showing the illumination space.

FIG. 1A is a pattern diagram showing a situation of an illumination space such as an office where a plurality of illumination apparatuses 20 and a camera sensor module 10 are placed that constitute an illumination system, and FIG. 1B is a planar layout diagram showing the illumination space.

As shown in FIG. 1A, in the illumination space, the illumination apparatuses 20 and the camera sensor module 10 are placed on a ceiling surface C (first surface). Such an illumination space is assumed to be an office or the like where work desks and so on are placed on a floor surface F (second surface) that is opposed to the ceiling surface C. Each two adjacent illumination apparatuses 20 have respective light irradiation ranges on the floor surface F that partially overlap one another (see dashed line in FIG. 1A). Accordingly, there is a case where two or more of the illumination apparatuses 20 are specified as an illumination apparatus 20 that irradiates a predetermined position on the floor surface F with light.

The illumination apparatuses 20 have attached thereto respective individual identification information pieces 20$a$2, 20$b$2, . . . . In the following description, an illumination apparatus 20 having attached thereto identification information 20$a$2 for example is also referred to as an illumination apparatus 20$a$2 for convenience.

As shown in FIG. 1B, on the ceiling surface C that constitutes the illumination space, 25 illumination apparatuses 20 are placed in a grid pattern such as illumination apparatuses 20$a$0, 20$b$0, . . . , 20$d$4.

Figure 2:
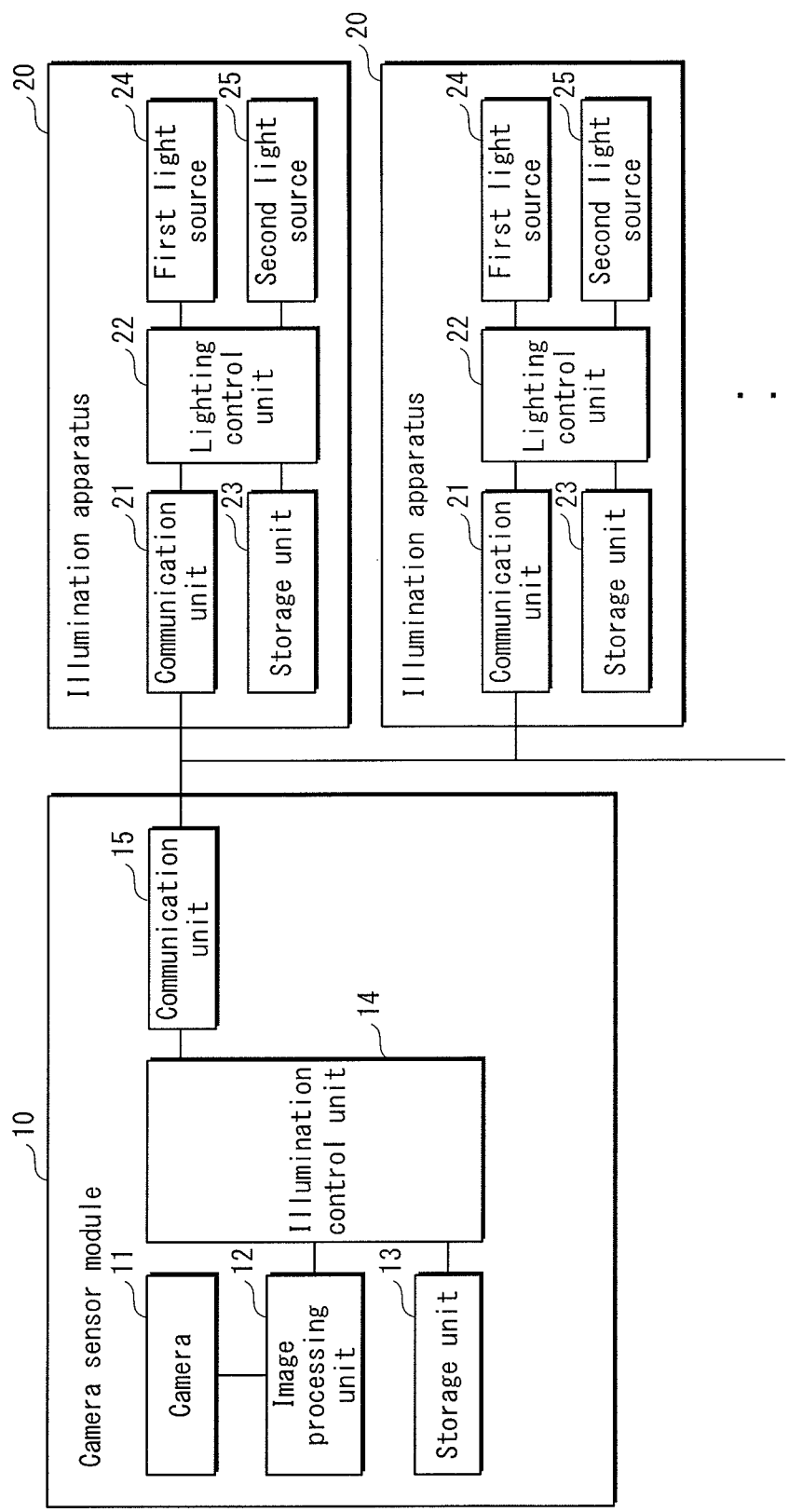
FIG. 2 is a block diagram showing the illumination system relating to Embodiment 1.

Next, more specific description is given on the illumination system relating to the present embodiment with reference to FIG. 2. As shown in FIG. 1B, the illumination system relating to the present embodiment includes 25 illumination apparatuses 20. Since all the illumination apparatuses 20 have the same structure, one illumination apparatus 20 is used as a representative example in the following description.

<1-1> Illumination Apparatus

The illumination apparatus 20 includes a communication unit 21, a lighting control unit 22, a storage unit 23, a first light source 24, and a second light source 25. Also, the illumination apparatus 20 has attached thereto individual identification information.

<First Light Source and Second Light Source>

The first light source 24 and the second light source 25 are each a light source installed in the illumination apparatus 20. In the present invention, the first light source 24 is a light source for irradiating the floor surface F that is opposed to the ceiling surface C with light among light sources installed in the illumination apparatus 20. On the other hand, the second light source 25 is a light source for irradiating the ceiling surface C with light among the light sources installed in the illumination apparatus 20. The first light source 24 and the second light source 25 each only need to be a light source capable of irradiating in a desired direction with light, and accordingly may be of any type. In terms of energy saving and so on, an LED light source using a light-emitting diode (LED) is optimal for the first light source 24 and the second light source 25.

In the present embodiment, as each of the first light source 24 and the second light source 25, an LED light source is used that includes an LED lamp and a lighting circuit for turning on the LED lamp.

<Communication Unit>

The communication unit 21 receives an instruction signal transmitted from the camera sensor module 10, and acquires identification information and lighting instruction information from the received instruction signal. Then, the communication unit 21 inputs the identification information and the lighting instruction information to the lighting control unit 22. The communication unit 21 may include a wireless transmission circuit for transmitting and receiving an instruction signal via an antenna, for example.

<Storage Unit>

The storage unit 23 stores therein identification information attached to each of the illumination apparatuses 20. In the examples shown in FIG. 1A and FIG. 1B, with respect to an illumination apparatus 20 having attached thereto identification information 20a2, the storage unit 23 stores therein code information 20a2. The storage unit 23 is for example a non-volatile memory.

<Lighting Control Unit>

The lighting control unit 22 is a processor. The lighting control unit 22 performs lighting control on the first light source 24 and the second light source 25, based on identification information and lighting instruction information input from the communication unit 21. Operations of the lighting control unit 22 are detailed later.

<1-2> Camera Sensor Module

As shown in FIG. 2, the camera sensor module 10 includes a camera 11, an image processing unit 12, a storage unit 13, an illumination control unit 14, and a communication unit 15.

<Camera>

The camera 11 captures a space between the ceiling surface C and the floor surface F, namely, an illumination space. The camera 11 is an infrared camera, a CCD camera, or the like.

<Image Processing Unit>

The image processing unit 12 acquires a plurality of pieces of image data from the camera 11, specifies a region where a person P is located (person P's position) based on the acquired pieces of image data, and generates position data indicating the person P's position. Here, the image processing unit 12 specifies the person P's position by detecting a motion of the person P from the pieces of image data.

Also, as shown in FIG. 1B, the illumination space is partitioned into nine columns of 0, 1, 2, . . . , 8 in the vertical direction and nine rows of a, b, . . . , i in the horizontal direction. That is, the illumination space is partitioned into 81 regions of nine columns and nine rows. The image processing unit 12 represents the person P's position by a coordinate value of abscissa and ordinate. In the example shown in FIG. 1B, the person P's position is represented as position data 4d.

<Storage Unit>

The storage unit 13 stores therein a management table. The management table includes identification information attached to each of the illumination apparatuses 20, irradiation range information indicating an irradiation range on the floor surface F by the first light source 24 of each of the illumination apparatuses 20, and adjacent relation information indicating identification information of an illumination apparatus 20 that is adjacent to each of the illumination apparatuses 20. The storage unit 13 is for example a non-volatile memory.

Here, the irradiation range information is information indicating, with respect to each of the illumination apparatuses 20, a region that is irradiated with light emitted from at least part of the first light source 24. For example, the irradiation range information of the illumination apparatus 20b2 indicates a hatched region shown in FIG. 1B. Also, the adjacent relation information is information composed of identification information of an illumination apparatus 20 that is adjacent to each of the illumination apparatuses 20. In the present embodiment, respective illumination apparatuses 20 that are placed left, right, upper, lower, and obliquely adjacent to each of the illumination apparatuses 20 as shown in FIG. 1B are each referred to as an adjacent illumination apparatus 20.

FIG. 4 is a conceptual diagram showing part of this management table. Actually, with respect to each of all the illumination apparatuses 20, identification information, irradiation range information, and adjacent relation information are set.

For example, with respect to the identification information 20b2 of the illumination apparatus 20b2 shown in FIG. 1B, coordinate values 3c, 4c, 5c, 3d, 4d, 5d, 3e, 4e, and 5e are set as irradiation range information so as to correspond to the identification information 20b2. Also, with respect to the identification information 20b2, identification information pieces 20a1, 20b1, 20c1, 20a2, 20c2, 20a3, 20b3, and 20c3 are set as adjacent relation information so as to correspond to the identification information 20b2.

<Illumination Control Unit>

The illumination control unit 14 acquires position data of the person P generated by the image processing unit 12. With use of the position data and the management table stored beforehand in the storage unit 13, the illumination control unit 14 specifies an illumination apparatus 20 whose first light source 24 is to be turned on, an illumination apparatus 20 whose second light source 25 is to be turned on, and an illumination apparatus 20 whose first light source 24 and second light source 25 are both to be turned off. Also, the illumination control unit 14 generates lighting instruction information with use of identification information of each of the specified illumination apparatuses 20. Operations of the illumination control unit 14 are detailed later. The illumination control unit 14 is for example a processor.

<Communication Unit>

The communication unit 15 is capable of communicating with the communication unit 21 included in the illumination apparatus 20. The communication unit 15 generates an instruction signal with use of identification information and lighting instruction information of the illumination apparatus 20. The communication unit 15 may include a wireless transmission circuit for transmitting and receiving an instruction signal via an antenna, for example.

Figure 3A:
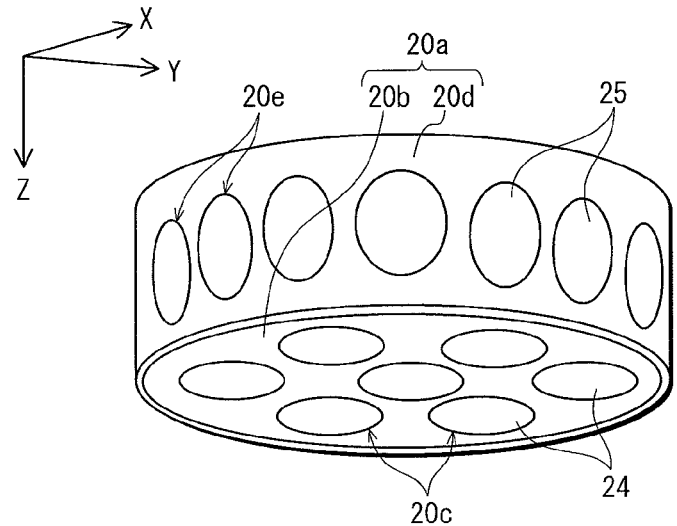
FIG. 3A-FIG. 3C are a perspective view, a side view, and a plane view showing the illumination apparatus relating to Embodiment 1, respectively.

Also, as shown in FIG. 3A, the illumination apparatus 20 includes a housing 20a that is cylindrical and has a bottom. A window 20c is provided in each of seven parts of a bottom wall 20b of the housing 20a. A light emission part of the first light source 24 is exposed from each of the windows 20c. Also, a plurality of windows 20e are provided in a side wall 20d of the housing 20a. A light emission part of the second light source 25 is exposed from each of the windows 20e.

The illumination apparatus 20 has the structure in which a side of the housing 20a that is opposed to the bottom wall 20b in the central axis direction of the housing 20a is attached to the ceiling surface C. In the following description, respective directions along a bottom surface of the bottom wall 20b are defined as an X direction and a Y direction, and the central axis direction of the housing 20a is defined as a Z direction.

Figure 3B:
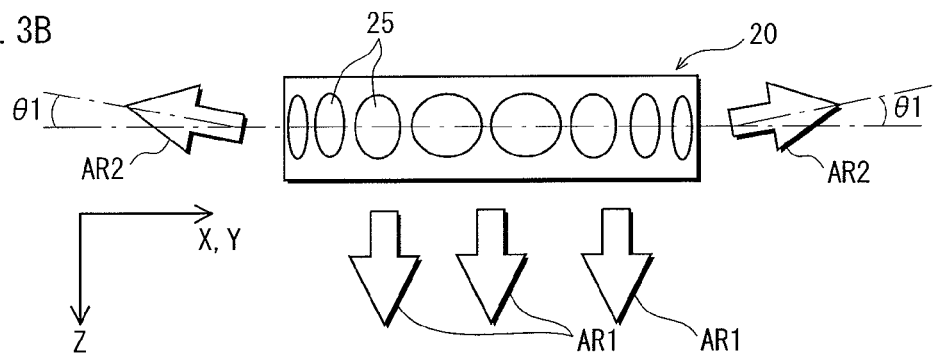
Figure 3C:
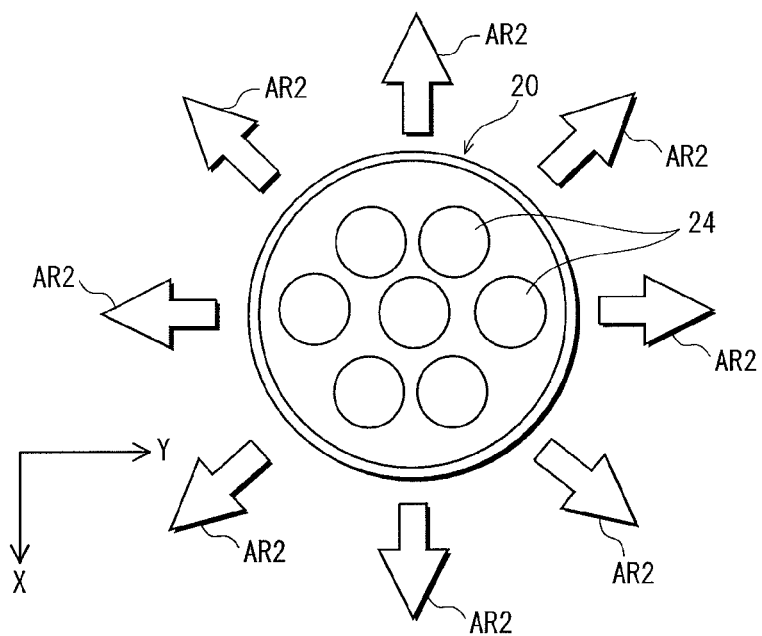

As shown in FIG. 3B, a main light emission direction AR1 of the first light source 24 is coincident with the Z direction. Also, a main light emission direction AR2 of the second light source 25 is inclined at an angle θ1 relative to an X-Y plane in a −Z direction. As shown in FIG. 3C, the main light emission direction AR2 of the second light source 25 extends outward from the central axis of the housing 20a. This enables the first light source 24 and the second light source 25 to irradiate the floor surface F and the ceiling surface C with light, respectively. Note that Japanese Patent Application Publication No. 2011-171226 for example also discloses an illumination apparatus that includes a light source for irradiating a floor surface with light and a light source for irradiating a ceiling surface with light.

FIG. 5 shows a format of an instruction signal used in the illumination system relating to the present embodiment.

The instruction signal is composed of a bit pattern MSB indicating the start of the signal, identification information identifying each of the illumination apparatuses 20, lighting instruction information instructing to set a lighting state, an error detection code for signal error detection, and a bit pattern LSB indicating the end of the signal. Here, the identification information and the lighting instruction information each have allocated thereto a predetermined number of bits. For example, the identification information and the lighting instruction information each may be represented as a bit pattern of eight bits.

The lighting instruction information is first light source lighting instruction information, second light source lighting instruction information, or NULL information. The first light source lighting instruction information is information instructing to turn on the first light source 24 and turn off the second light source 25. The second light source lighting instruction information is information instructing to turn on the second light source 25 and turn off the first light source 24. Also, the NULL information is information instructing to turn off both the first light source 24 and the second light source 25. Specifically, the first light source lighting instruction information, the second light source lighting instruction information, and the NULL information are each represented as a different bit pattern.

Note that the format of the instruction signal is not limited to the format shown in FIG. 5, and may be appropriately modified in accordance with the specifications of the camera sensor module 10 and so on.

This communication unit 15 and the above-described illumination control unit 14 and storage unit 13 constitute a control unit for controlling the lighting state of each of the illumination apparatuses 20.

<2> Operations of Illumination System
<2-1> Operations of Camera Sensor Module

Figure 6:
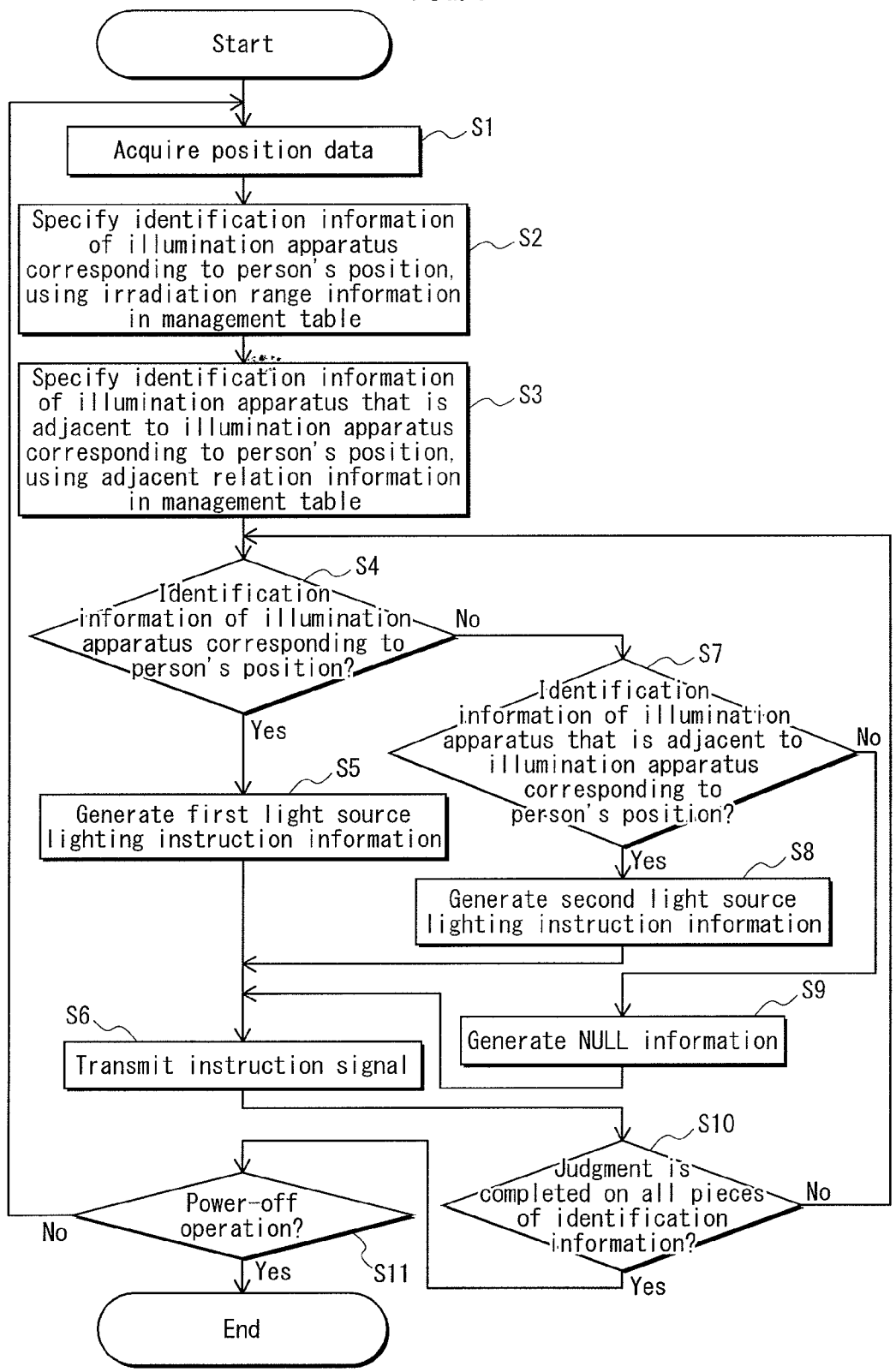
FIG. 6 is a flowchart showing operations of a control unit included in the camera sensor module relating to Embodiment 1.

Description is given on operations of the camera sensor module, particularly operations of the control unit that constitutes part of the camera sensor module. FIG. 6 is a flowchart showing the operations of the control unit.

Firstly, the control unit acquires position data generated by the image processing unit 12 (Step S1). In the example shown in FIG. 1B, the control unit acquires, from the image processing unit 12, position data indicating the region 4d including a position where the person P is located.

Next, the control unit specifies identification information of an illumination apparatus 20 that corresponds to the person P's position (hereinafter, person position corresponding identification information), with use of the position data acquired from the image processing unit 12 and irradiation range information included in the management table stored in the storage unit 13 (Step S2).

In the example shown in FIG. 1B, the position data of the person P indicates the region 4d. In this case, the control unit specifies the identification information 20b2 of the illumination apparatus 20b2 whose irradiation range includes the region 4d, with use of the management table shown in FIG. 4.

Then, the control unit specifies identification information of an illumination apparatus 20 that is adjacent to the illumination apparatus 20 that corresponds to the person P's position (hereinafter, adjacency identification information), with use of the position data acquired from the image processing unit 12 and adjacent relation information included in the management table stored in the storage unit 13 (Step S3).

In the example shown in FIG. 1B, the illumination apparatus 20b2 that corresponds to the person P's position is identified by the identification information 20b2. In this case, the control unit specifies identification information pieces 20a1, 20b1, ... of respective illumination apparatuses 20 that are each adjacent to the illumination apparatus 20b2, with use of the management table shown in FIG. 4.

Next, the control unit selects, as a judgment target, one piece among all the identification information pieces, and judges whether the target identification information is person position corresponding identification information (Step S4).

If judging that the target identification information is person position corresponding identification information (Step S4: Yes), the control unit generates first light source lighting instruction information (Step S5), and performs broadcast transmission of an instruction signal including the target identification information and the generated first light source lighting instruction information (Step S6).

On the other hand, if judging that the target identification information is not person position corresponding identification information (Step S4: No), the control unit judges whether the target identification information is adjacency identification information (Step S7).

If judging that the target identification information is adjacency identification information (Step S7: Yes), the control unit generates second light source lighting instruction information (Step S8), and performs broadcast transmission of an instruction signal including the target identification information and the generated second light source lighting instruction information (Step S6).

On the other hand, if judging that the target identification information is not adjacency identification information (Step S7: No), the control unit generates NULL information (Step S9), and performs broadcast transmission of an instruction signal including the target identification information and the generated NULL information (Step S6).

After performing the processing of Step S7, the control unit judges whether the above judgments are completed on all the identification information pieces. The control unit repeatedly performs the above judgments until judging that the above judgments are completed on all the identification information pieces (Step S10).

As a result, in the example shown in FIG. 1B, only the illumination apparatus 20b2 is judged in Step S4 to be an illumination apparatus 20 having attached thereto person position corresponding identification information (Step S4: Yes), and the illumination apparatus 20b2 turns on the first light source 24. Also, the illumination apparatuses 20a1, 20b1, 20c1, 20a2, 20c2, 20a3, 20b3, and 20c3 are each judged in Step S4 not to be an illumination apparatus 20 having attached thereto person position corresponding identification information (Step S4: No), and are each judged in Step S7 to be an illumination apparatus 20 having attached thereto adjacency identification information (Step S7: Yes), and therefore turn on the respective second light sources 25.

Other remaining illumination apparatus 20 is judged in Step S4 not to be an illumination apparatus 20 having attached thereto person position corresponding identification information, and furthermore is judged in Step S7 not to be an illumination apparatus 20 having attached thereto adjacency identification information. Therefore, the remaining illumination apparatus 20 turns off both the first light source 24 and the second light source 25.

If completing the above judgments on all the identification information pieces (Step S10: Yes), the control unit repeatedly performs the processing of Steps 1-10 until a power-off operation is performed (Step S11). This enables the lighting state of each of the illumination apparatuses 20 to follow a motion of the person P who moves within the illumination space.

If the power-off operation is performed (Step S11: Yes), the control unit ends the processing.

By the way, according to the illumination system relating to the present embodiment, there is a range on the floor surface F which is included in respective light irradiation ranges of the first light sources 24 of each two adjacent illumination apparatuses 20 (refer to ranges F1, F2, and F3 shown in FIG. 1A for example, such a range is hereinafter referred to as overlapping range). In the case where the person P's position is included in the overlapping range, the adjacent illumination apparatuses 20 each can have attached thereto adjacency identification information in addition to person position corresponding identification information. For example, assume that the person P's position is included in the overlapping range F2 that overlaps between a light irradiation range of the first light source 24 of the illumination apparatus 20b2 and a light irradiation range of the first light source 24 of the illumination apparatus 20c2. In this case, since the person P's position is included in the light irradiation range of the first light source 24 of the illumination apparatus 20b2, the illumination apparatus 20b2 can have attached thereto person position corresponding identification information. At the same time, since the person P's position is also included in the light irradiation range of the first light source 24 of the illumination apparatus 20c2, the illumination apparatus 20c2 also can have attached thereto person position corresponding identification information. However, since the illumination apparatus 20b2 is an illumination apparatus 20 that is adjacent to the illumination apparatus 20c2, the illumination apparatus 20b2 also can have attached thereto adjacency identification information. Similarly, the illumination apparatus 20c2 also can have attached thereto adjacency identification information due to the relation with the illumination apparatus 20b2.

In response to this circumstance, with respect to each of the illumination apparatuses 20, the control unit relating to the present embodiment firstly judges whether the illumination apparatus 20 is an illumination apparatus 20 having attached thereto person position corresponding identification information. Then, with respect to only an illumination apparatus 20 judged not to be an illumination apparatus 20 having attached thereto person position corresponding identification information, the control unit judges whether the illumination apparatus 20 is an illumination apparatus 20 having attached thereto adjacency identification information.

As a result, in the case where the person P's position is included in the overlapping range F2 shown in FIG. 1A for example, the illumination apparatuses 20b2 and 20c2 turn on only the respective first light sources 24, and do not turn on the respective second light sources 25.

In other words, identification information of an illumination apparatuses 20 can be judged to be both person position corresponding identification information and adjacency identification information, the person position corresponding identification information is preferentially applied.

<2-2> Operations of Illumination Apparatus

Next, description is given on the operations of the illumination apparatus 20, particularly operations of the lighting control unit 22 that constitutes part of the illumination apparatus 20.

Figure 7:
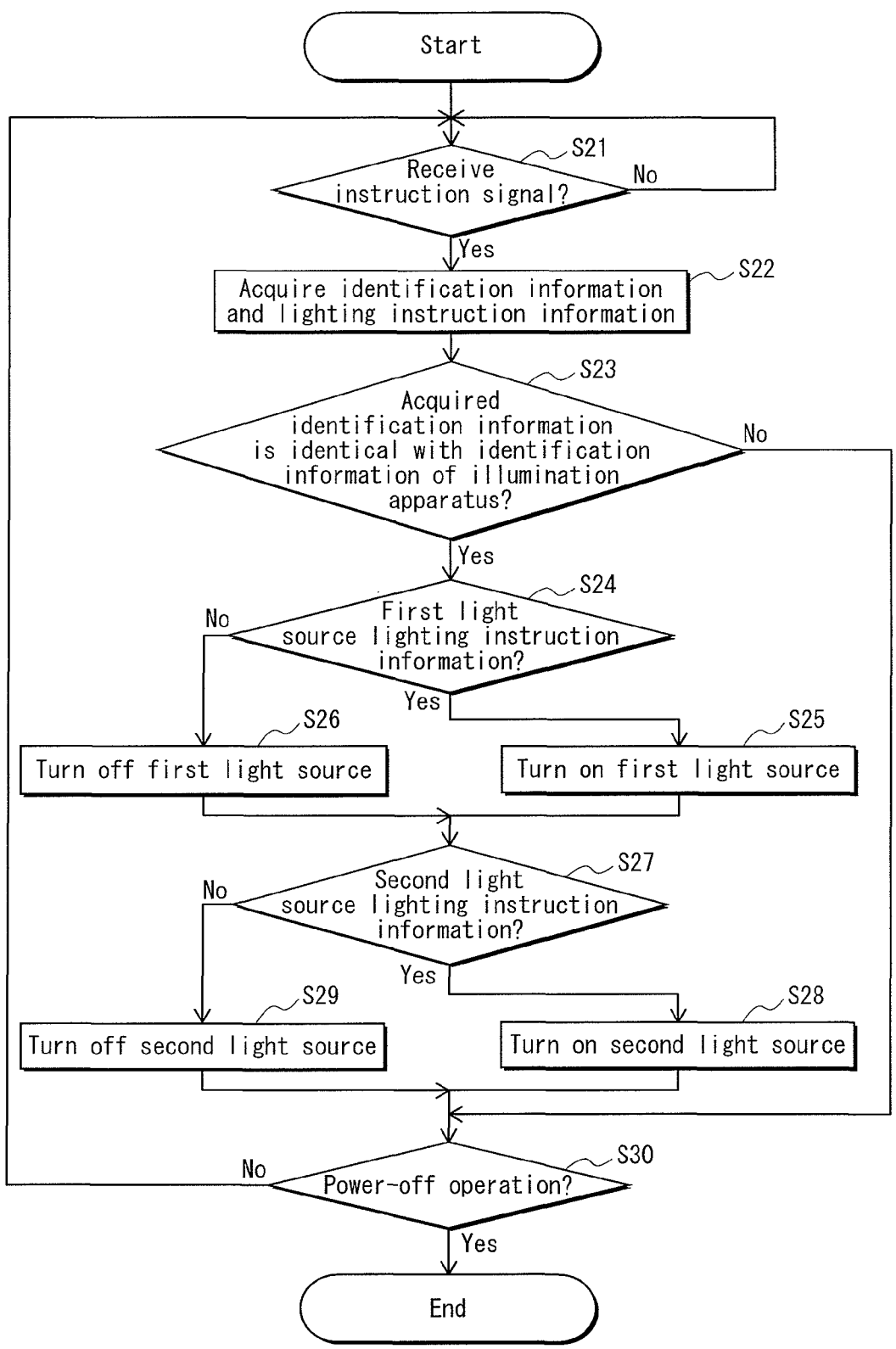
FIG. 7 is a flowchart showing operations of a lighting control unit included in the illumination apparatus relating to Embodiment 1.

FIG. 7 is a flowchart showing the operations of the lighting control unit 22.

Firstly, when power source is switched on, the lighting control unit 22 judges whether an instruction signal has been received from the camera sensor module 10 (Step S21).

Until the communication unit 21 receives an instruction signal (Step S21: No), the lighting control unit 22 remains in a waiting state. When the communication unit 21 receives an instruction signal (Step S21: Yes), the lighting control unit 22 acquires identification information and lighting instruction information from the instruction signal received by the communication unit 21 (Step S22).

Then, the lighting control unit 22 judges whether the acquired identification information is identical with identification information of the illumination apparatus 20 (Step S23).

In Step S23, if judging that the acquired identification information is not identical with the identification information of the illumination apparatus 20 (Step S23: No), the lighting control unit 22 proceeds to processing of Step S30 which is later described. Here, the lighting control unit 22 does not input a signal to the first light source 24 and the second light source 25, and remains the first light source 24 and the second light source 25 in an immediate previous state. For example, in the case where the first light source 24 and the second light source 25 have been in OFF state immediately previously, the first light source 24 and the second light source 25 are remained in OFF state. On the other hand, in the case where the first light source 24 and the second light source 25 have been in ON state immediately previously, the first light source 24 and the second light source 25 are remained in ON state.

On the other hand, in Step S23, if judging that the acquired identification information is identical with the identification information of the illumination apparatus 20 (Step S23: Yes), the lighting control unit 22 judges whether the acquired lighting instruction information is first light source lighting instruction information (Step S24).

In Step S24, if judging that the acquired lighting instruction information is first light source lighting instruction information (Step S24: Yes), the lighting control unit 22 turns on the first light source 24 (Step S25). Here, in the case where the first light source 24 has been in OFF state, the first light source 24 is switched to ON state. Also, in the case where the first light source 24 has been in ON state, the first light source 24 is remained in ON state.

On the other hand, in Step S24, if judging that the acquired lighting instruction information is not first light source lighting instruction information (Step S24: No), the lighting control unit 22 turns off the first light source 24 (Step S26). Here, in the case where the first light source 24 has been in ON state, the first light source 24 is switched to OFF state. Also, in the case where the first light source 24 has been in OFF state, the first light source 24 is remained in OFF state.

Next, the lighting control unit 22 judges whether the acquired lighting instruction information is second light source lighting instruction information (Step S27).

In Step S27, if judging that the acquired lighting instruction information is second light source lighting instruction information (Step S27: Yes), the lighting control unit 22 turns on the second light source 25 (Step S28). Here, in the case where the second light source 25 has been in OFF state, the second light source 25 is switched to ON state. Also, in the case where the second light source 25 has been in ON state, the second light source 25 is remained in ON state.

On the other hand, in Step S27, if judging that the acquired lighting instruction information is not second light source lighting instruction information, in other words, if judging that the acquired lighting instruction information is NULL information (Step S27: No), the lighting control unit 22 turns off the second light source 24 (Step S29). Here, in the case where the second light source 25 has been in ON state, the second light source 25 is switched to OFF state. Also, in the case where the second light source 25 has been in OFF state, the second light source 25 is remained in OFF state.

Then, the lighting control unit 22 judges whether a power-off operation is performed (Step S30).

In Step S30, if judging that the power-off operation is not performed (Step S30: No), the lighting control unit 22 again proceeds to the processing of Step S21.

In Step S30, if judging that the power-off operation is performed (Step S30: Yes), the lighting control unit 22 ends the processing.

<3> Characteristics of Illumination System

Description is given on characteristics of the illumination system relating to the present embodiment, using comparison with a comparative example.

Figure 8A:
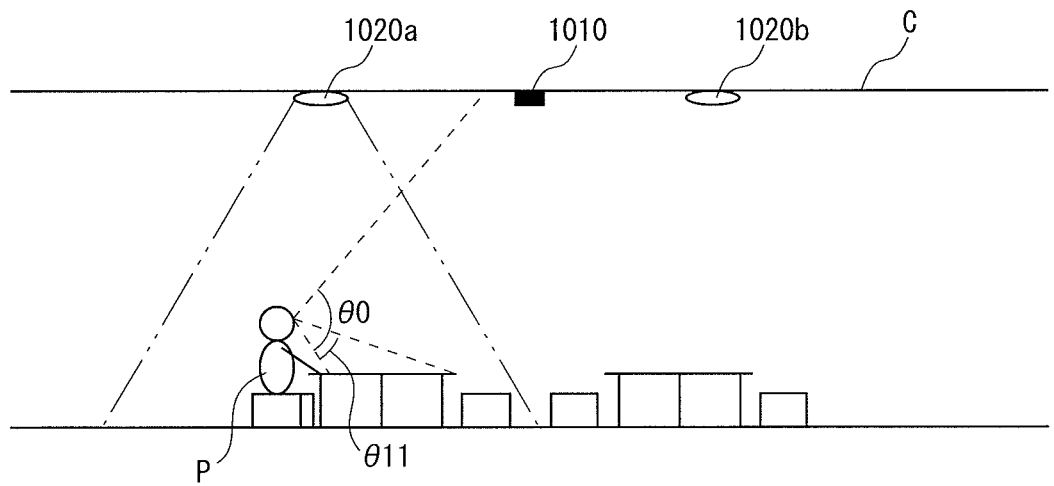
FIG. 8A and FIG. 8B are each a pattern diagram showing a situation of an illumination space where a plurality of illumination apparatuses and a camera sensor module are placed that constitute an illumination system relating to a comparative example.
Figure 8B:
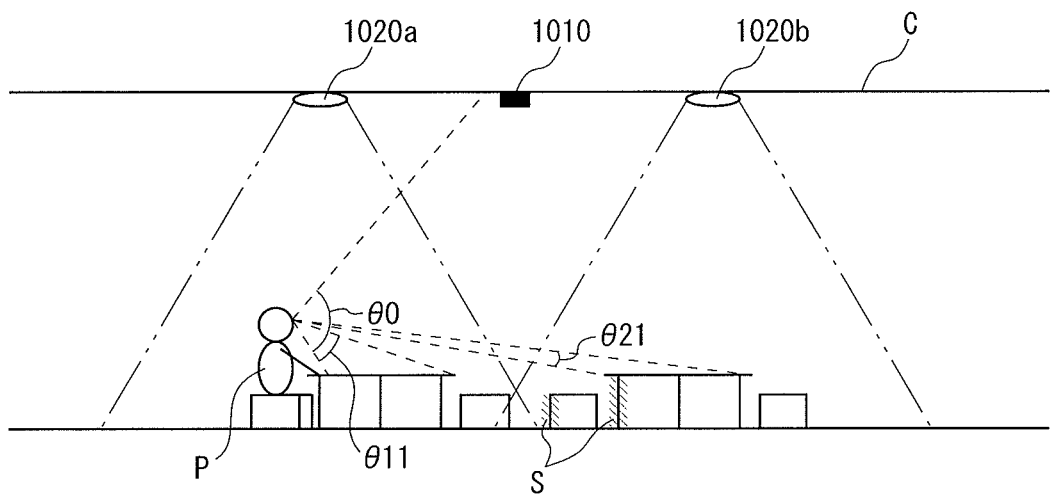

FIG. 8A and FIG. 8B are each a pattern diagram showing a situation of an illumination space where a plurality of illumination apparatuses and a camera sensor module are placed that constitute an lighting system relating to the comparative example.

The illumination system shown in FIG. 8A includes a person position detection device 1010 that is placed on a ceiling surface C and detects a position of a person P and a plurality of illumination apparatuses that are placed on the ceiling surface C such as illumination apparatuses 1020a and 1020b. The illumination apparatus 1020a is turned on that is able to irradiate with light the person P's position detected by the person position detection device 1010, and other illumination apparatus such as the illumination apparatus 1020b is turned off among the illumination apparatuses placed on the ceiling surface C. This results in reduction of power consumption in the entire illumination system. Also, according to the illumination system shown in FIG. 8A, a desktop and so on placed around the person P (region included in a range of a visual angle θ11 in FIG. 8A) are irradiated with light emitted from the illumination apparatus 1020a (see two-dot chain line in FIG. 8A) among regions included in a visual field of the person P (region included in a range of a visual angle θ0 in FIG. 8A) in the illumination space. Accordingly, brightness is ensured on the surface of the desk and so on placed around the person P.

However, according to this illumination system, the ceiling surface C and a region on the floor surface F and a region on the desktop that are distant from the surroundings of the person P are not irradiated with light emitted from the illumination apparatus 1020a. Also, the ratio of the region where brightness is ensured such as the desktop and so on placed around the person P to the entire illumination space is small. Therefore, according to the illumination system shown in FIG. 8A, there is a tendency that the person P feels that a region where brightness is ensured in the illumination space is narrow and the entire illumination space is dark.

The illumination system shown in FIG. 8B is the same as the illumination system shown in FIG. 8A. However, according to the illumination system shown in FIG. 8B, the illumination apparatus 1020a that corresponds to the person P's position is turned on, and the illumination apparatus 1020b that is adjacent to the illumination apparatus 1020a is also turned on (see two-dot chain line in FIG. 8B). This aims to improve the person P's sense of brightness by increasing regions on the floor surface F, the desktop, and so on where brightness is ensured.

However, according to the illumination system shown in FIG. 8B, in the case where a work desk, a chair, and so on are placed on a region that is irradiated with light emitted from the illumination apparatus 1020b, the person P can view a light irradiation region of the illumination apparatus 1020b where shadow S appears on each of the work desk, the chair, and so on. As a result, the region where brightness is ensured when viewed from the person P in the illumination space (region included in the range of the visual angle θ11 in FIG. 8A) decreases as the range of the shadow S that appears on the work desk, the chair, and so on increases. This might result in impossibility of improving the sense of brightness felt by the person P.

Next, description is given on the characteristics of the illumination system relating to the present embodiment.

Figure 9:
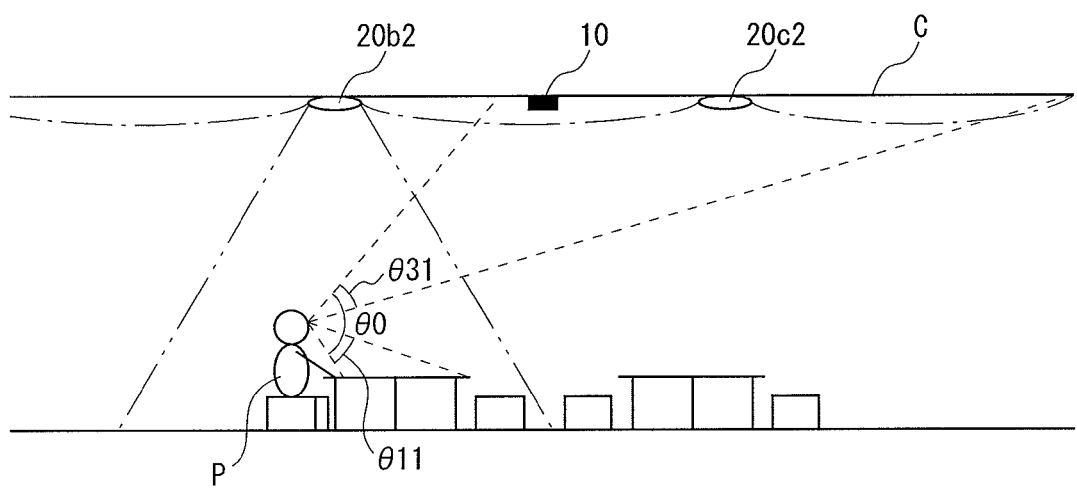
FIG. 9 is a pattern diagram showing a situation of an illumination space where the illumination apparatuses and the camera sensor module are placed that constitute the illumination system relating to Embodiment 1.

FIG. 9 is a pattern diagram showing a situation of an illumination space where the illumination apparatuses and the camera sensor module are placed that constitute the illumination system relating to the present embodiment.

According to the illumination system relating to the present embodiment as shown in FIG. 9, the desktop and so on placed around the person P (region included in a range of a visual angle θ11 in FIG. 9) and part of the ceiling surface C (region included in a range of a visual angle θ31 in FIG. 9) are irradiated with light, among a region included in a range of the person P's visual field (region included in a range of a visual angle θ0 in FIG. 9) in the illumination space. Here, the desktop and so on placed around the person P are irradiated with light emitted from the first light source 24 (see two-dot chain line in FIG. 9), and the part of the ceiling surface C is irradiated with light emitted from the second light source 25 (see dashed line in FIG. 9).

As clear from the above comparison, according to the illumination system relating to the comparative example shown in FIG. 8A, brightness is ensured for the region included in the range of the visual angle θ11, and according to the illumination system relating to the comparative example shown in FIG. 8B, brightness is ensured for the region included in the range of the visual angles θ11+θ21. Compared with this, according to the illumination system relating to the present embodiment, brightness is ensured for the region included in the range of the visual angles θ11+θ31. Here, there is no element on the ceiling surface C that generates a shadow of each of the work desk, the chair, and so on. Accordingly, a region where brightness is ensured on the ceiling surface C easily tends to be increased compared with the floor surface F. In other words, the region where brightness is ensured on the ceiling surface C, which is included in the range of the visual angle θ31, is generally larger than the region where brightness is ensured on the floor surface F, which is included in the range of the visual angle θ21 where a work desk, a chair, and so on are often placed, among the region included in the range of the person P's visual angle θ0.

Therefore, according to the illumination system relating to the present embodiment, the person P feels that a region where brightness is ensured in the illumination space is larger and the entire illumination space is more bright compared with the illumination systems relating to the comparative examples shown in FIG. 8A and FIG. 8B.

Figure 10:
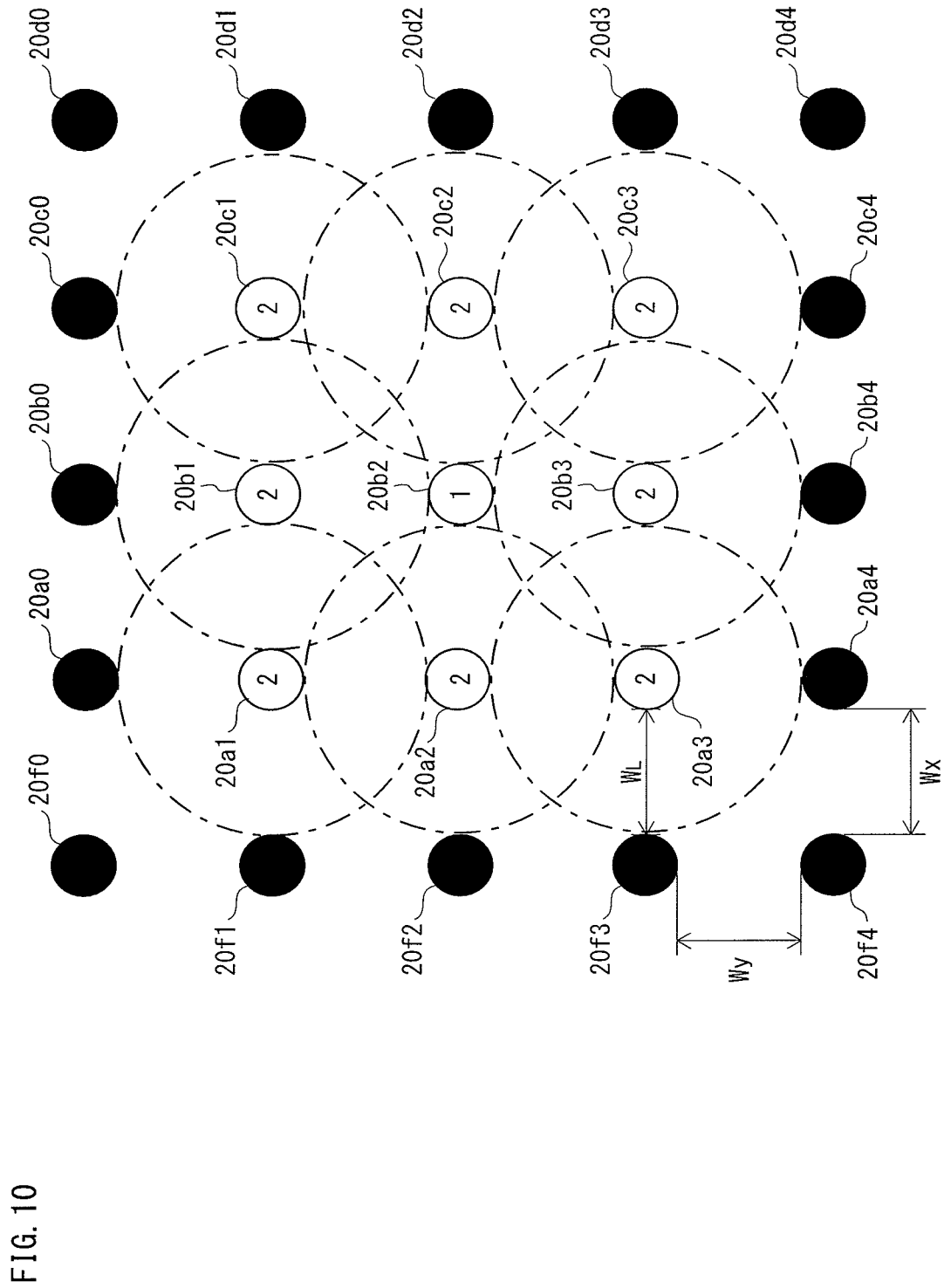
FIG. 10 is a pattern diagram showing a situation where the illumination apparatuses are placed on a ceiling surface that constitute part of the illumination system relating to Embodiment 1.

FIG. 10 is a pattern diagram showing a situation where the illumination apparatuses 20 are placed on the ceiling surface C that constitute part of the illumination system relating to the present embodiment. In FIG. 10, a circle enclosing a number 1 by solid line indicates that the first light source 24 is turned on, and a circle enclosing a number 2 by solid line indicates that the second light source 25 is turned on. Also, a black circle indicates that both the first light source 24 and the second light source 25 are turned off. Furthermore, a circle by dashed line indicates an irradiation range on the ceiling surface C while the second light source 25 is turned on.

In the example shown in FIG. 10, in the case where the person P is located on a position corresponding to the position data 4d, the illumination apparatus 20b2 turns on the first light source 24. Also, the illumination apparatuses 20a1, 20b1, 20c1, 20a2, 20c2, 20a3, 20b3, and 20c3, which are each adjacent to the illumination apparatus 20b2, each turn on only the second light source 25 and turns off the first light source 24. Other illumination apparatuses 20f0, 20a0, ..., 20d4 each turn off both the first light source 24 and the second light source 25.

According to the illumination system relating to the present embodiment as described above, when the person P's position in the illumination space (the position included in the region 4d in FIG. 1B) is detected, the illumination apparatus 20b2, which is able to irradiate the person P's position with light, turns on the first light source 24, and also eight illumination apparatuses 20a1, 20b1, ..., 20c3, which are each adjacent to the illumination apparatus 20b2 that turns on the first light source 24, each turn on the second light source 25 (see FIG. 10). As a result, the ceiling surface C is irradiated with light emitted from the second light sources 25. Therefore, compared with the illumination systems relating to the comparative examples shown in FIG. 8A and FIG. 8B, brightness is ensured around the person P in a region included in a range of the person P's visual field in the illumination space. Furthermore, brightness is ensured on the ceiling surface C that fills most part of the person P's visual field. This improves the sense of brightness felt by the person P.

In this way, it is possible to improve the comfort in the illumination space by improving the sense of brightness felt by the person P in the illumination space.

<4> Summary

According to the illumination system relating to the present embodiment where the illumination apparatuses 20 are placed on the ceiling surface C for example, the illumination apparatuses 20 each include the first light source 24 for irradiating the floor surface F with light and the second light source 25 for irradiating the ceiling surface C with light. Also, the control unit controls, among the illumination apparatuses 20, the illumination apparatus 20b2 that corresponds to the person P's position to turn on the first light source 24, and the illumination apparatuses 20a1, 20a2, ..., 20c3 that are each adjacent to the illumination apparatus 20b2 not to turn on the respective first light sources 24 and to turn on the respective second light sources 25 (see FIG. 10).

The control unit controls the illumination apparatuses 20a1, 20a2, ..., 20c3, which are each adjacent to the illumination apparatus 20b2, not to turn on the respective first light sources 24. Accordingly, electric power consumption decreases in the illumination apparatuses 20a1, 20a2, ..., 20c3, which are each adjacent to the illumination apparatus 20b2, thereby realizing energy saving.

Also, the control unit controls, among the illumination apparatuses 20, the illumination apparatus 20b2 that corresponds to the person P's position to turn on the first light source 24, and the illumination apparatuses 20a1, 20a2, ..., 20c3 that are each adjacent to the illumination apparatus 20b2 to turn on the respective second light sources 25. Accordingly, it is possible to ensure brightness around the person P on the floor surface F and brightness of the ceiling surface C in the visual field of the person P who is located in the illumination space. This improves the sense of brightness felt by the person P. As a result, there are many bright regions when viewed from the entire visual field of the person P who is located in the illumination space, and accordingly the person feels that the entire illumination space is bright. This improves the comfort in the illumination space.

<Irradiation Range of Second Light Source 25>

According to the illumination system relating to the present embodiment, a distance Wx between each two adjacent illumination apparatuses 20 in the column direction and a distance Wy between each two adjacent illumination apparatuses 20 in the row direction are each set to 1.7 m for example (see FIG. 10). A length WL (also referred to as irradiation distance) from one illumination apparatus (the illumination apparatus 20a3 for example) placed on the ceiling surface C to the edge of an irradiation range of the second light source 25 of the illumination apparatus 20a3 (the edge of the illumination apparatus 20f3 on the side of the adjacent illumination apparatus 20a3) is set to 1.7 m, which is equal to the distances Wx and Wy between each two adjacent illumination apparatuses 20.

The length WL is longer than half the distance Wx between the illumination apparatus 20a3 and the illumination apparatus 20f3, which is adjacent to the illumination apparatus 20a3. With this structure, it is possible to irradiate all over the ceiling surface C that enters the person P's visual field with light emitted from the second light source 25, thereby reducing unevenness in brightness of the ceiling surface C. This reduces discomfort that the person P feels when observing the illumination space.

Embodiment 2

In the present embodiment, an illumination apparatus 20 (illumination apparatus 20b2 in the example shown in FIG. 10) that corresponds to a position where a person is located is controlled to turn on both the first light source 24 and the second light source 25. Detail description is given below.

An illumination system relating to the present embodiment differs from the illumination system relating to Embodiment 1, in terms of that the camera sensor module 10 generates both light sources lighting instruction information in processing of Step 5 in FIG. 6 instead of first light source lighting instruction information and in terms of processing performed by the lighting control unit 22 included in each of the illumination apparatuses 20. Here, the both light sources lighting instruction information is information instructing to turn on both the first light source 24 and the second light source 25.

Firstly, description is given on operations of the lighting control unit 22 included in the illumination apparatus 20.

Figure 11:
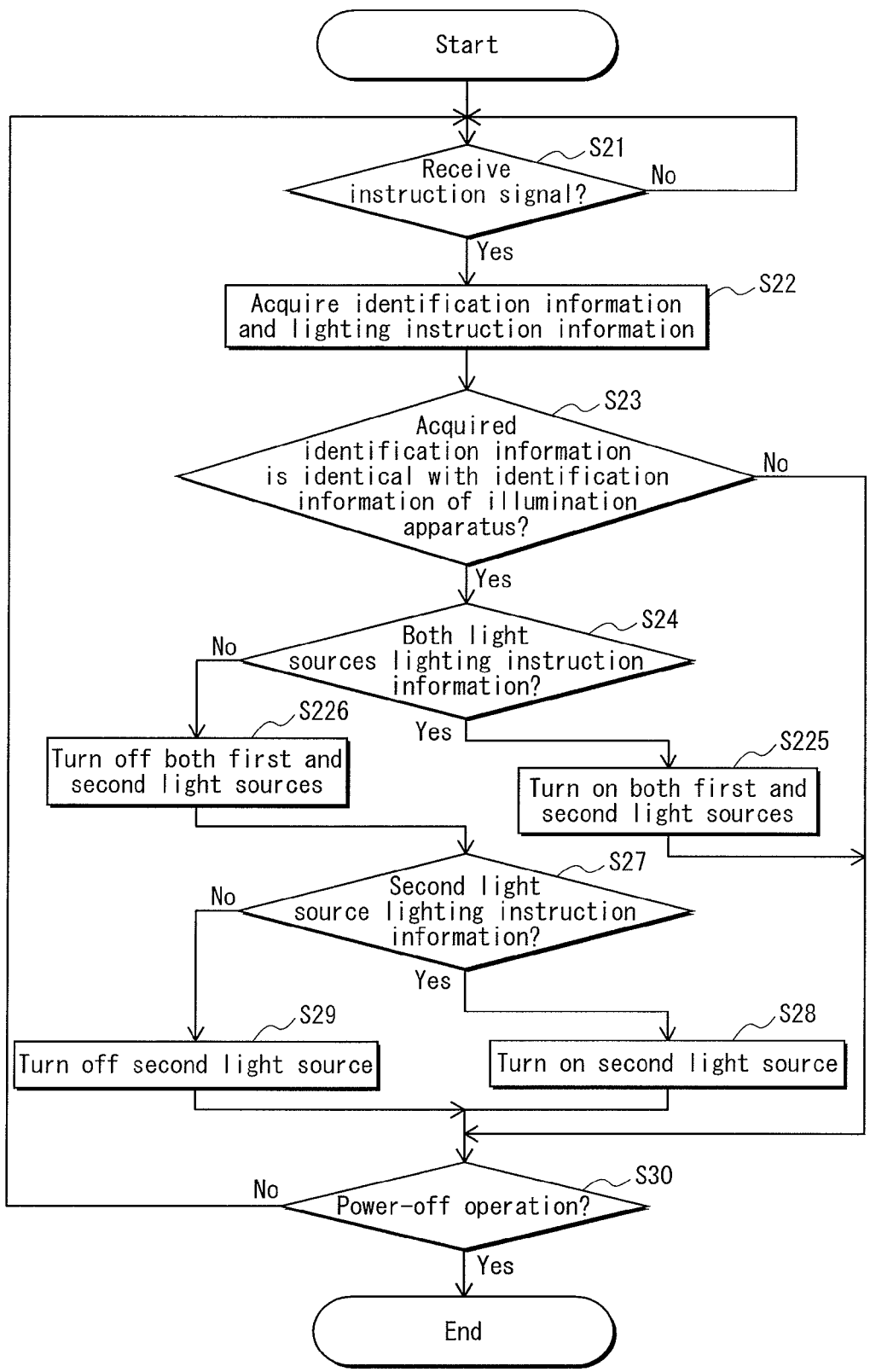
FIG. 11 is a flowchart showing operations of a lighting control unit included in an illumination apparatus relating to Embodiment 2.

FIG. 11 is a flowchart showing the operations of the lighting control unit 22 included in the illumination apparatus 20. Note that processing that is the same as that of the lighting control unit 22 included in the illumination apparatus 20 relating to Embodiment 1 has the same reference numerals as those in FIG. 7, and description thereof is appropriately omitted here.

If judging that acquired identification information is identical with identification information of the illumination apparatus 20 (Step S23: Yes), the lighting control unit 22 judges whether the acquired lighting instruction information is both light sources lighting instruction information (Step S24).

If judging that the acquired lighting instruction information is both light sources lighting instruction information, the lighting control unit 22 turns on both the first light source 24 and the second light source 25 (Step S225).

Next, the lighting control unit 22 performs processing of Step S30.

On the other hand, if judging that the acquired lighting instruction information is second light source lighting instruction information, the lighting control unit 22 turns off both the first light source 24 and the second light source 25 (Step S226).

Next, the lighting control unit 22 performs processing of Step S27.

This completes the main operations of the lighting control unit 22 included in the illumination apparatus 20 relating to the present embodiment.

Next, description is given on the characteristics of the illumination system relating to the present embodiment.

Figure 12:
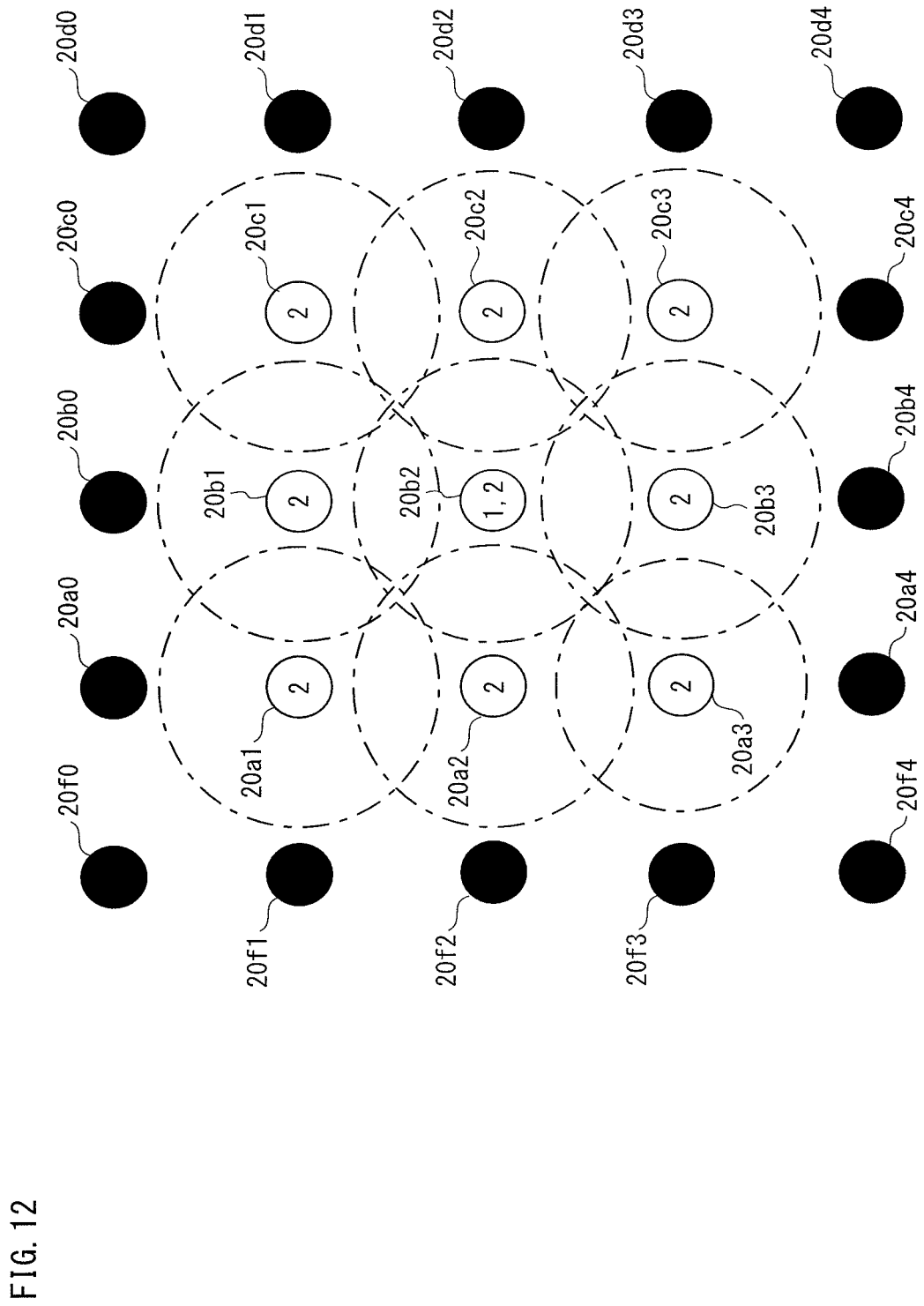
FIG. 12 is a pattern diagram showing a situation where a plurality of illumination apparatuses are placed on a ceiling surface that constitute part of an illumination system relating to Embodiment 2.

FIG. 12 is a pattern diagram showing a situation where the illumination apparatuses 20 are placed on the ceiling surface C that constitute part of the illumination system relating to the present embodiment. In FIG. 12, a circle enclosing numbers 1, 2 by solid line indicates that both the first light source 24 and the second light source 25 are turned on, and a circle enclosing a number 2 by solid line indicates that the second light source 25 is turned on. Also, a black circle indicates that both the first light source 24 and the second light source 25 are turned off. Furthermore, a circle by dashed line indicates an irradiation range on the ceiling surface C while the second light source 25 is turned on.

In the example shown in FIG. 12, the person P is located in the position corresponding to the position data 4d similarly to in Embodiment 1 (see FIG. 1B). Here, the illumination apparatus 20b2 turns on not only the first light source 24 but also the second light source 25. Also, the illumination apparatuses 20a1, 20b1, 20c1, 20a2, 20c2, 20a3, 20b3, and 20c3, which are each adjacent to the illumination apparatus 20b2, each turn on only the second light source 25 and turn off the first light source 24, similarly to in Embodiment 1. Other illumination apparatuses 20f0, 20a0, . . . , 20d4 each turn off both the first light source 24 and the second light source 25 are turned off.

With this structure, the illumination system relating to the present embodiment exhibits an advantage that all over the ceiling surface C is irradiated with light even if the illumination apparatuses 20 each have a narrow irradiation range of the second light source 25, compared with the illumination system relating to Embodiment 1.

Embodiment 3

According to an illumination system relating to the present embodiment, an illumination apparatus 20 is specified that turns off the first light source 24 and turns on the second light source 25 in accordance with a direction in which a person faces who is located in an illumination space. Detail description is given below.

The illumination system relating to the present embodiment is the same as the illumination system relating to Embodiment 1, except for a management table stored in a storage unit 13 included in a camera sensor module 10 and operations of a control unit included in the camera sensor module 10.

<Management Table>

FIG. 13 is a conceptual diagram showing the management table relating to the present embodiment.

In the management table, with respect to each of the illumination apparatuses 20, adjacent relation information is composed of identification information pieces of respective illumination apparatuses 20 that are placed right, left, upper, and lower adjacent to the illumination apparatus 20. The adjacent relation information of the illumination apparatus 20 corresponds to identification information of the illumination apparatus 20. Here, the respective illumination apparatuses 20 that are placed adjacent right, left, upper, and lower to the illumination apparatus 20 indicate the illumination apparatuses 20 that are adjacent to the illumination apparatus 20 rightward, leftward, upward, and downward, respectively in FIG. 1B.

According to the management table shown in FIG. 13, an illumination apparatus 20 that is right adjacent to the illumination apparatus 20b2 is identified by identification information 20c2, and an illumination apparatus 20 that is left adjacent to the illumination apparatus 20b2 is identified by identification information 20a2, for example. Also according to the management table, an illumination apparatus 20 that is upper adjacent to the illumination apparatus 20b2 is identified by identification information 20b1, and an illumination apparatus 20 that is lower adjacent to the illumination apparatus 20b2 is identified by identification information 20b3.

<Operations of Control Unit of Camera Sensor Module 10>

Figure 14:
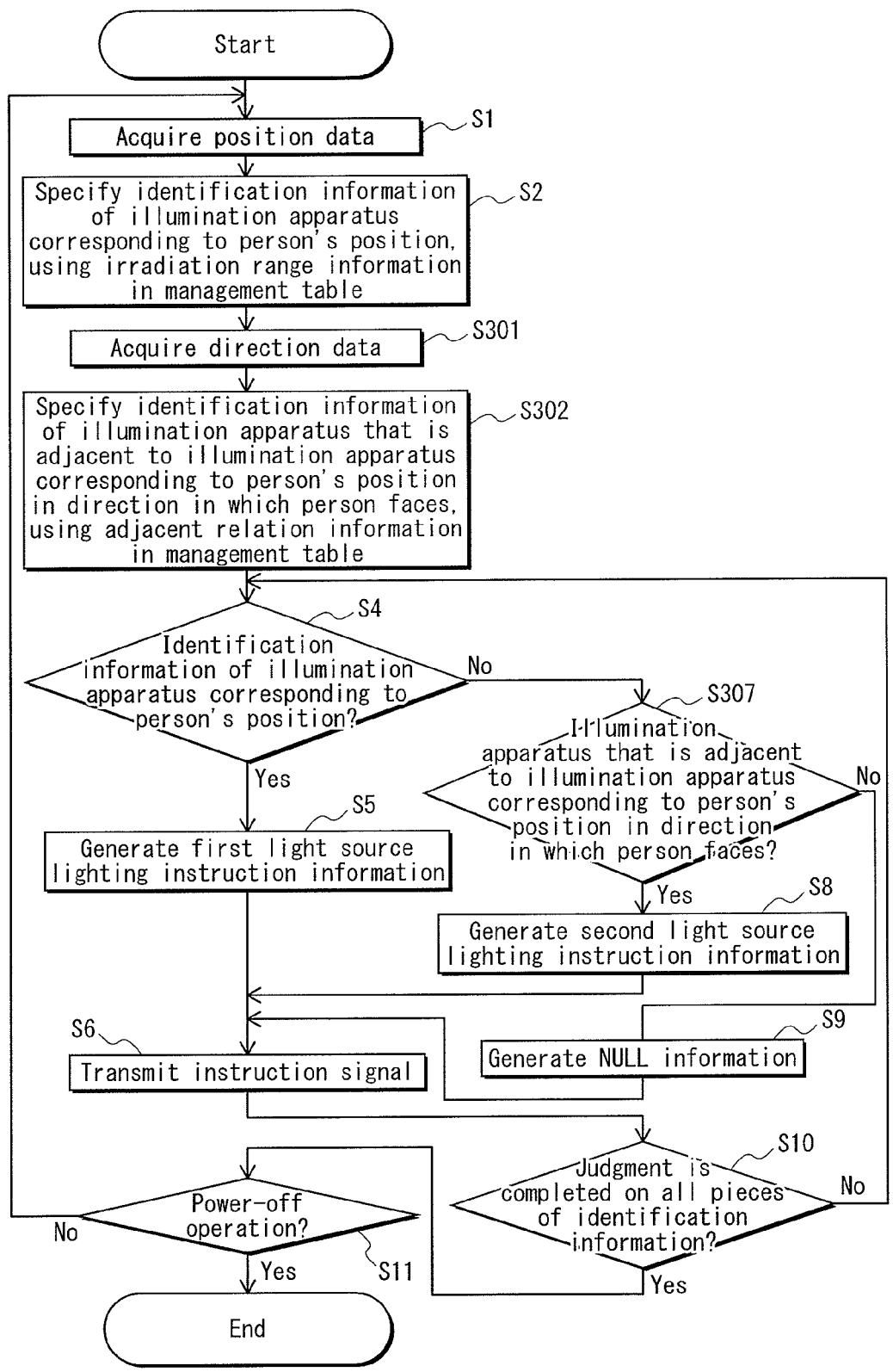
FIG. 14 is a flowchart showing operations of a control unit included in a camera sensor module relating to Embodiment 3.

FIG. 14 is a flowchart showing the operations of the control unit included in the camera sensor module 10. Note that processing that is the same as that of the control unit relating to Embodiment 1 has the same reference numerals as those in FIG. 6, and description thereof is appropriately omitted here.

After performing processing of Step S2, the control unit acquires data indicating a direction in which the person P faces (hereinafter, direction data) from the image processing unit 12 (Step S301). In other words, the image processing unit 12 performs template matching processing to detect the direction in which the person P faces. Specifically, the image processing unit 12 stores beforehand therein respective templates corresponding to the left, right, up, and down directions in which a person faces in image data stored in the camera 11. The image processing unit 12 subsequently performs matching processing on the templates. The control unit acquires the direction data from the image processing unit 12 in this manner.

In the example shown in FIG. 1B, the image processing unit 12 judges that the person P who is located in the region 4d faces in the right direction in the image data. Then, the image processing unit 12 inputs, to the control unit (illumination control unit 14), direction data indicating the direction in which the person P faces, namely, the right direction.

Next, with use of the acquired direction data and the management table, the control unit specifies identification information of an illumination apparatus 20 that is adjacent to an illumination apparatus 20 that corresponds to the person P's position in the direction in which the person P faces (Step S302). In the example shown in FIG. 1B, the control unit specifies the illumination apparatus 20c2 that is right adjacent to the illumination apparatus 20b2 that corresponds to the region 4d.

Then, the control unit judges whether target identification information is identification information of an illumination apparatus 20 corresponding to the person P's position (person position corresponding identification information) (Step S4).

If judging that the target identification information is not person position corresponding identification information (Step S4: No), the control unit judges whether the target identification information is identification information of an illumination apparatus 20 that is adjacent to the illumination apparatus 20 that corresponds to the person P's position in the direction in which the person P faces (Step S307).

This completes the description on the main operations of the control unit included in the camera sensor module 10 relating to the present embodiment.

<Characteristics of Illumination System>

Description is given on the characteristics of the illumination system relating to the present embodiment.

Figure 15:
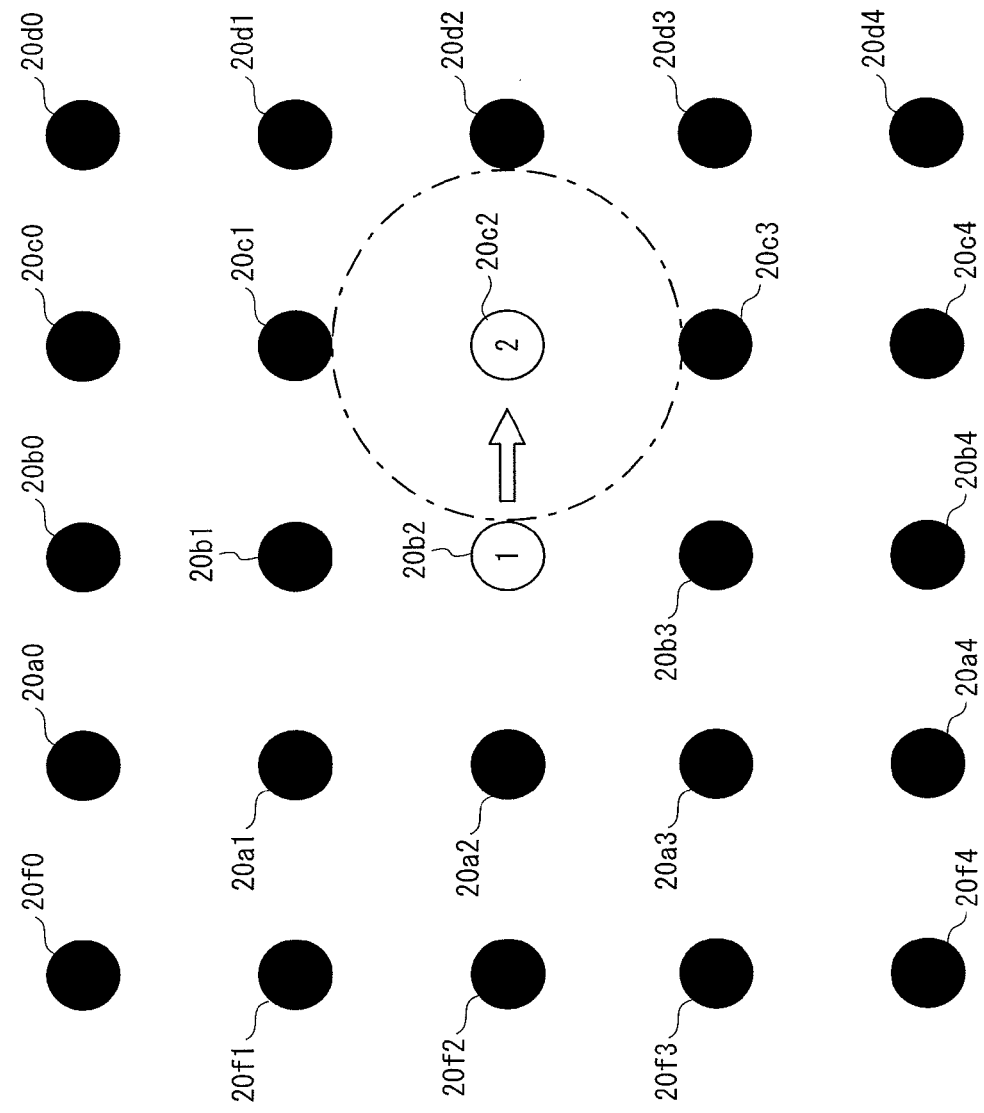
FIG. 15 is a pattern diagram showing a situation where a plurality of illumination apparatuses are placed on a ceiling surface that constitute part of an illumination system relating to Embodiment 3.

FIG. 15 is a pattern diagram showing a situation where the illumination apparatuses 20 are placed on the ceiling surface C that constitute part of the illumination system relating to the present embodiment. In FIG. 15, a circle enclosing a number 1 by solid line indicates that the first light source 24 is turned on, and a circle enclosing a number 2 by solid line indicates that the second light source 25 is turned on. Also, a black circle indicates that both the first light source 24 and the second light source 25 are turned off. Furthermore, a circle by dashed line indicates an irradiation range on the ceiling surface C while the second light source 25 is turned on.

In the example shown in FIG. 15, the person P is located in the position corresponding to the position data 4d (see FIG. 1B), similarly to Embodiment 1. Also, the person P faces in the right direction in the image data (see arrow in FIG. 15). Here, the illumination apparatus 20b2 turns on the first light source 24. Also, only the illumination apparatus 20c2, among the illumination apparatuses 20a1, 20b1, 20c1, 20a2, 20c2, 20a3, 20b3, and 20c3 that are each adjacent to the illumination apparatus 20b2, turns on the second light source 25. Other illumination apparatuses 20a1, 20b1, . . . , 20c3 each turn off both the first light source 24 and the second light source 25.

With this structure, the control unit detects the direction in which the person P faces who is located in the illumination space. Then, in accordance with the detected direction in which the person P faces, the control unit controls, among the illumination apparatuses 20a1, 20b1, 20c1, 20a2, 20c2, 20a3, 20b3, and 20c3 that are each adjacent to the illumination apparatus 20b2, only the illumination apparatus 20c2, which is adjacent to the illumination apparatus 20b2 in the direction in which the person P faces, to turn on the second light source 25. As a result, only the illumination apparatus 20c2 is turned on, which irradiates with light a region on the ceiling surface C that enters the person P's visual field. This further reduces power consumption.

Modification Examples of Embodiments (1) The angle θ1 relating to the second light source 25 (see FIG. 3B) in Embodiments 1 to 3 may be determined based on a brightness index (Feu value). The following describes in detail the concept of the Feu value.

In illumination design of an illumination space such as an office, design of placement and illuminance of illumination apparatuses has been generally performed focusing on illuminance of a floor surface, a desktop of a work desk, and so on, such that the illuminance of the floor surface, the desktop of the work desk, and so on fall within a desired range.

However, a visual field of a person who is located in the illumination space includes a ceiling surface and a wall surface in addition to the floor surface and the desktop. Accordingly, if an illumination space is designed focusing on only the illuminance on the floor surface, the desktop of the work desk and so on, the person who is located in the illumination space feels that the entire illumination space is dark, and the comfort in the illumination space is spoiled. This is because the brightness of the ceiling surface and the wall surface is not taken into consideration.

In response to this problem, there has been proposed a method of designing an illumination space with use of the concept of the brightness index (Feu value) as an index for evaluating the sense of brightness of the entire illumination space (see Reference 1: Japanese Patent Application Publication No. 2007-171055).

Here, the Feu value is an evaluation value of brightness of an illumination space that the person feels when observing the illumination space. The Feu value is defined based on the so called theory of the border luminance of color appearance mode (see Reference 2: New Lighting Evaluation Techniques for Comfortable Lighting Spaces Using Sensation-of-Room-Brightness Index "Feu", Matsushita Technical Journal Vol. 53 No. 2 Jan. 2008). In the theory of the border luminance of color appearance mode, change in color appearance mode in the field of visual psychophysics is applied. Here, change in color appearance mode is a phenomenon that as the brightness of a color chart placed in an illumination space increases, an appearance of the color chart by an observer changes from as if the color chart is an object to as if the color chart is a light source emitting light therefrom. In the theory of the border luminance of color appearance mode, an attention is focused on that a luminance of the color chart where change in color appearance mode occurs (so called the border luminance of color appearance mode) differs depending on the brightness of the illumination space. The value of the border luminance of color appearance mode is defined as an index value relatively representing the brightness of the illumination space.

The higher the Feu value is, the person who is located in the illumination space feels more bright. The lower the Feu value is, the person who is located in the illumination space feels darker. The larger an area of a bright region in the illumination space is, the higher the Feu value is. The smaller the area of the bright region in the illumination space is, the lower the Feu value is. Accordingly, in order to increase the brightness of the illumination space, it is effective to adopt an illumination method for increasing the area of the region where the brightness is ensured in the illumination space.

The Feu value is proportional to the border luminance of color appearance mode, as described above. The border luminance of color appearance mode can be estimated based on the mean value of luminance in the visual field.

Here, the mean value of luminance in the visual field is equal to the mean value of luminance of regions in an induced visual field (equivalent to a range of visual angle of 100 degree left and right and 85 degree up and down). The induced visual field is defined as a range of a visual field that is strongly influenced by a space.

Also, the mean value of luminance is equal to a geometric mean value of luminance in the regions in the induced visual field.

Furthermore, the mean value of luminance is calculated with exception of a region having a luminance of 1000 cd/m$^2$ or higher. This is because most of regions each having a high luminance in the visual field is considered not to influence the sense of brightness of the illumination space.

The following relational expression represented by Math. 1 is satisfied among the mean value of luminance in the visual field, the border luminance of color appearance mode, and the Feu value.

[Math. 1]

$$Feu = \frac{1.5}{4.2}Lc = .5 \times Lg^{0.7} \qquad \text{(Math. 1)}$$

Here, Lc represents the border luminance of color appearance mode, and Lg represents the mean value of luminance in the visual field.

As an indicator in illumination design of an illumination space, the Feu value is preferably approximately 10.

According to the illumination system relating to the present modification example, an angle θ1 is set that is formed by an X-Y plane and the main light emission direction AR2 of the second light source 25 based on the above expertise.

FIG. 16 is a pattern diagram for explaining a relation between the angle θ1 and an irradiation range of the second light source 25. Here, the X-Y plane is synonymous with the X-Y plane described with reference to FIG. 3A to FIG. 3C.

As shown in FIG. 16, the greater the angle θ1 is, the smaller the irradiation range of the second light source 25 is, and the smaller the angle θ1 is, the larger the irradiation range of the second light source 25 is.

In response to this, according to the illumination system relating to the present modification example, the angle θ1 is selected that is formed by the X-Y plane and the main light emission direction AR2 of the second light source 25 in each of the illumination apparatuses 20, such that the Feu value is approximately 10. Specifically, by appropriately selecting the angle θ1, adjustment is made on an area of a region where brightness is ensured that is included in the visual field of the person P who is located in the illumination space, thereby adjusting the mean value of luminance in the visual field. Here, the mean value Lg of luminance corresponding to the Feu value of 10 is calculated with use of Math. 1, and the angle θ1 is selected based on the calculated mean value Lg of luminance.

According to the present modification example, it is possible to realize a comfortable illumination space where the Feu value is set to approximately 10.

(2) Efficiency of visual work performed by the person P who is located in an office or the like decreases due to a troublesome shadow of his own hand on a paper, reflected glare that is caused by reflection of light emitted from the illumination apparatuses 20 on a surface of the paper, and so on.

Figure 17A:
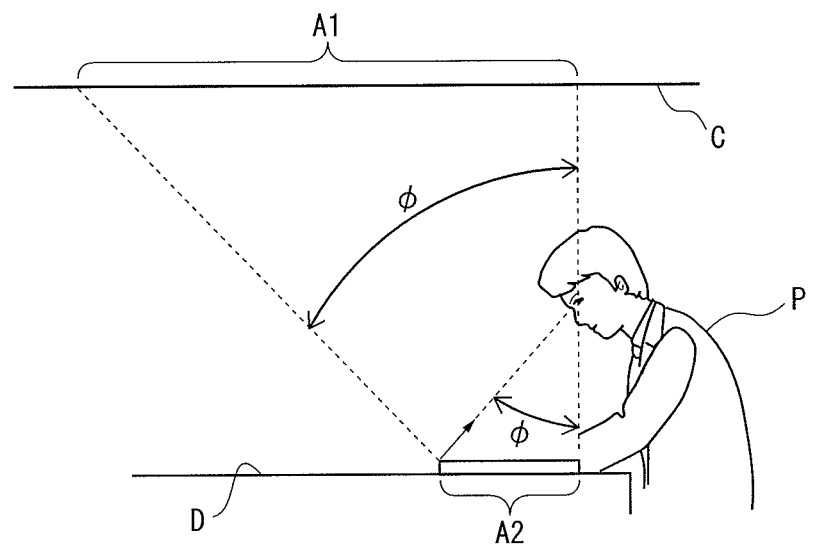
FIG. 17A shows a situation where a person performs visual work.
Figure 17B:
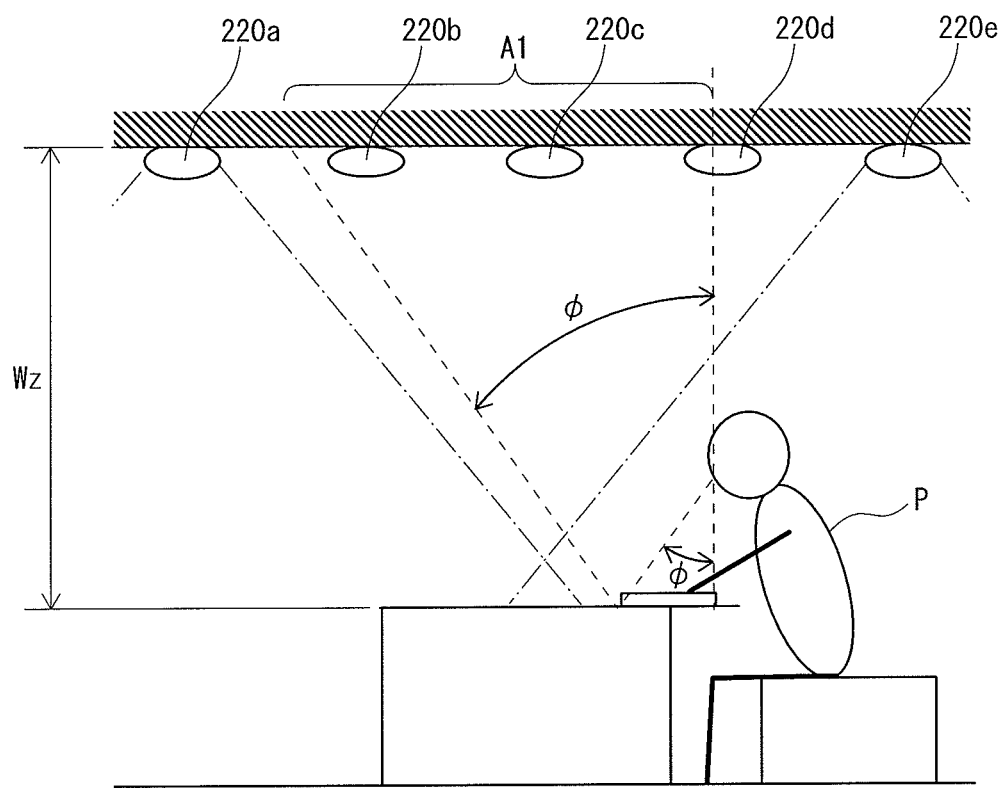
FIG. 17B shows operations of an illumination system relating to a modification example.

FIG. 17A shows a situation where the person P performs visual work, and FIG. 17B shows operations of an illumination system relating to the present modification example.

As shown in FIG. 17A, when the person P views a paper placed on a desktop, a range of a visual angle φ enters the person P's visual field. In such a situation, it is generally known that light is preferably prevented from entering from a region A1 on the ceiling surface C toward a region A2 included in the person P's visual field on a desktop D. Here, the region A2 is a region located between the following two intersection lines: an intersection line between the ceiling surface C and a surface that includes a position of the person P's eyes and is perpendicular to the desktop D; and an intersection line between the ceiling surface C and a plain surface on the desktop D where the most distant edge in the region A2 included in the person P's visual field forms an angle φ with a surface that is perpendicular to the desktop D. The angle φ is approximately 40 degrees.

In view of this, according to the illumination system relating to the present modification example, a distance Wz between the ceiling surface C and the desktop D is calculated based on image data stored in the camera 11, and a range of the region A1 is specified with use of the calculated distance Wz and the angle φ. Then, an illumination apparatus 220 placed in the region A1 on the ceiling surface C is specified among a plurality of illumination apparatuses 220. The illumination apparatus 220 placed in the region A1 is controlled not to turn on the first light source 24.

In the example shown in FIG. 17B, illumination apparatuses 220a and 220e are placed outside the region A1 on the ceiling surface C, and each include the first light source 24 that is able to irradiate around the person P with light. Accordingly, the illumination apparatuses 220a and 220e are controlled to turn on the respective first light sources 24. On the other hand, illumination apparatuses 220b, 220c, and 220d that are placed in the region A1 on the ceiling surface C are controlled not to turn on the respective first light sources 24.

With this structure, it is possible to suppress a troublesome shadow of the person P's hand on a paper, reflected glare that is caused by reflection of light emitted from the illumination apparatuses 220 on a surface of the paper, and so on. This improves the efficiency of visual work performed by the person P who is located in the illumination space.

(3) According to an illumination apparatus 20 relating to the present modification example, light emitted from the first light source 24 for irradiating a desktop and so on is set to have a color temperature of approximately 5000 K, and light emitted from the second light source 25 for irradiating a ceiling surface C is set to have a color temperature of approximately 3000 K, which is lower than the color temperature of light emitted from the first light source 24.

Generally, when a color temperature of an illumination space increases, an environment with ensured functionality is realized where papers are easy to view for example. On the other hand, when the color temperature of the illumination space decreases, an environment that gives warm impression where a person who is located in the illumination space feels comfortable. In consideration of this, the following both are realized by adopting this structure. Specifically, it is possible to ensure the functionality of the illumination space, by setting the color temperature of light emitted from the first light source 24 for irradiating the desktop and so on to approximately 5000 K. Also, it is possible to realize an environment where that gives warm impression where a person who is located in the illumination space feels comfortable, by setting the color temperature of light emitted from the second light source 25 for irradiating the ceiling surface C to approximately 3000 K, which is lower than the color temperature of light emitted from the first light source 24.

Therefore, from a standpoint of ensuring functionality of an illumination space and realizing an environment that gives the sense of comfort to a person in the illumination space, the first light source 24 and the second light source 25 preferably have a color temperature in a range of 4200 K to 5000 K and a color temperature in a range of 3000 K to 5000 K, respectively. However, the respective ranges of the color temperatures of the first light source 24 and the second light source 25 are not limited to the above ranges, and may be adjusted appropriately in accordance with the space design and so on. In this case, the color temperature of the first light source 24 may be set to be higher than the color temperature of the second light source 25. Also, it is possible to perform space design that is more optimal for a person who is located in the space, by allowing a user to select and set the respective color temperatures of light emitted from the first light source 24 and the second light source 25 such that the above conditions are satisfied.

(4) In Embodiments 1 and 2, description has been given on the example where the illumination apparatus 20a1, 20b1, . . . , 20c3, which are each adjacent to the illumination apparatus 20b2 that turns on the first light source 24, turn on the respective second light sources 25. Alternatively, all the illumination apparatuses 20 may turn on the respective second light sources 25.

(5) As described in Embodiment 1, from a standpoint for ensuring functionality of the illumination space and realizing an environment where a person feels comfortable in the illumination space, it is preferable that the length between the illumination apparatus 20b2 and the edge of the irradiation range of the second light source 25 of the illumination apparatus 20b2 (the edge of the illumination apparatus 20c2 that is adjacent to the illumination apparatus 20b2) (irradiation distance) is substantially equal to the distance Wx between the illumination apparatuses 20b2 and 20c2.

Note that, in the present invention, the irradiation distance does not need to be substantially equal to the distance Wx. As long as the irradiation distance is for example equal to or longer than half the distance Wx between the illumination apparatus 20b2 and the illumination apparatus 20c2, it is possible to ensure the functionality of the illumination space and realize an environment where a person feels comfortable in the illumination space.

(6) In Embodiments 1-3, the description has been given on the example where the first light source 24 and the second light source 25 are each composed of a separate LED lamp. Alternatively, the first light source 24 and the second light source 25 may be implemented in a pseudo manner, so as to have the structure where part of light emitted from one of the light sources is reflected on the ceiling surface C, for example.

(7) In Embodiments 1-3, the description has been given on the example where the illumination apparatuses 20 and the person position detection unit are placed on the ceiling surface C (first surface), and the respective first light sources 24 of the illumination apparatuses 20 irradiate the floor surface F (second surface) with light. Alternatively, the illumination apparatuses 20 and the person position detection unit may be placed on a first wall surface (first surface) in a room, and the respective first light sources 24 of the illumination apparatuses 20 may irradiate with light the floor surface F (second surface) or a second wall surface (second surface) that is opposed to the first wall surface, for example.

(8) In the present invention, there is no special limitation on the configuration of the camera sensor module 10. For example, the camera sensor module 10 may have a configuration of detecting radio field intensity transmitted from a wireless transmitter held by a person, and detecting a position of the person based on the detected radio field intensity. Alternatively, the camera sensor module 10 may include a doppler sensor or a pyroelectric sensor.

(9) In Embodiments 1-3, the description has been given on the example where the camera sensor module 10 includes both the person position detection unit and the control unit. Alternatively, the person position detection unit and the control unit each may be configured by a separate apparatus.

(10) In Embodiments 1-3, the description has been given on the example where the person position detection unit is composed of a single camera 11 and the image processing unit 12. Alternatively, the person position detection unit may for example include a presence sensor placed on each of a plurality of positions in an illumination space, and calculate a position of a person based on a position where a presence sensor that has detected the person.

REFERENCE SIGNS LIST 10 camera sensor module
11 camera
12 image processing unit
13 storage unit
14 illumination control unit
15, 21 communication unit
16 timer
20, 220 illumination apparatus
22 lighting control unit
23 storage unit
24 first light source
25 second light source

The invention claimed is:

1. An illumination system comprising:
a plurality of illumination apparatuses that are placed on a first surface;
a person position detection unit configured to detect a position of a person who is located in a space between the first surface and a second surface that is opposed to the first surface; and
a control unit configured to control a lighting state of each of the plurality of illumination apparatuses in accordance with the position of the person detected by the person position detection unit, wherein
each of the plurality of illumination apparatuses includes a first light source that irradiates the second surface with light and a second light source that irradiates the first surface with light,
the control unit controls, among the plurality of illumination apparatuses, an illumination apparatus corresponding to the position of the person so as to turn on the first light source, and
the control unit controls, among the plurality of illumination apparatuses, at least one of one or more illumination apparatuses that are each adjacent to the illumination apparatus that turns on the first light source, so as to turn on the second light source without turning on the first light source.

2. The illumination system of claim 1, wherein
the control unit controls the illumination apparatus that turns on the first light source so as to turn on the second light source.

3. The illumination system of claim 1, wherein
the person position detection unit is further configured to detect a direction in which the person faces,
the control unit controls the at least one illumination apparatus that is adjacent, in the direction in which the person faces detected by the person position detection unit, to the illumination apparatus that turns on the first light source, so as to turn on the second light source without turning on the first light source.

4. The illumination system of claim 1, wherein
the control unit controls all of the one or more illumination apparatuses that are each adjacent to the illumination apparatus that turns on the first light source, so as to turn on the respective second light sources.

5. The illumination system of claim 1, wherein
the control unit controls all of the plurality of illumination apparatuses so as to turn on the respective second light sources.

6. The illumination system of claim 1, wherein
the first light source has a higher color temperature than the second light source.

* * * * *